US012092116B2

(12) United States Patent
Linsmeier et al.

(10) Patent No.: US 12,092,116 B2
(45) **Date of Patent: *Sep. 17, 2024**

(54) FLUID DELIVERY SYSTEM HEALTH MONITORING SYSTEMS AND METHODS

(71) Applicant: Oshkosh Corporation, Oshkosh, WI (US)

(72) Inventors: Eric R. Linsmeier, Larsen, WI (US); John D. Woelfel, Winneconne, WI (US); David W. Archer, Hortonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 326 days.

This patent is subject to a terminal disclaimer.

(21) Appl. No.: 17/530,905

(22) Filed: Nov. 19, 2021

(65) Prior Publication Data

US 2022/0074417 A1 Mar. 10, 2022

Related U.S. Application Data

(63) Continuation of application No. 16/286,007, filed on Feb. 26, 2019, now Pat. No. 11,181,111.

(Continued)

(51) Int. Cl.

| | |
|---|---|
| ***F04D 15/00*** | (2006.01) |
| ***A62C 27/00*** | (2006.01) |
| ***A62C 37/50*** | (2006.01) |
| ***F04D 1/00*** | (2006.01) |
| ***F04D 13/02*** | (2006.01) |
| ***F04D 13/06*** | (2006.01) |
| ***F04D 15/02*** | (2006.01) |

(Continued)

(52) U.S. Cl.

CPC .............. *F04D 15/00* (2013.01); *A62C 27/00* (2013.01); *A62C 37/50* (2013.01); *F04D 1/00* (2013.01); *F04D 13/027* (2013.01); *F04D 13/06* (2013.01); *F04D 13/0606* (2013.01); *F04D 13/064* (2013.01); *F04D 15/0066* (2013.01); *F04D 15/0077* (2013.01); *F04D 15/0088* (2013.01); *F04D 15/0209* (2013.01); *F04D 15/0254* (2013.01); *F04D 15/0263* (2013.01); *F04D 27/001* (2013.01); *F04D 29/426* (2013.01)

(58) Field of Classification Search

CPC ..... A62C 27/00; A62C 37/50; F04D 15/0088; F04D 15/0066; F04D 13/06; F04D 29/426; F04D 1/00; F04D 15/0077; F04D 13/027; F04D 13/0606; F04D 13/064; F04D 27/001; F04D 15/00; F04D 15/0254; F04D 15/0263; F04D 15/0209

See application file for complete search history.

(56) References Cited

U.S. PATENT DOCUMENTS

| | | | | |
|---|---|---|---|---|
| 4,189,005 A * | 2/1980 | McLoughlin | .......... | A62C 27/00 700/282 |
| 5,538,274 A | 7/1996 | Schmitz et al. | | |

(Continued)

*Primary Examiner* — Peter J Bertheaud

(74) *Attorney, Agent, or Firm* — Foley & Lardner LLP

(57) ABSTRACT

A fluid supply system includes a fluid delivery system including a pump, a sensor configured to acquire data regarding the fluid delivery system, and a processing circuit coupled to the sensor. The processing circuit is configured to determine a health level of the fluid delivery system based on the data and provide a notification in response to the health level not satisfying a threshold.

18 Claims, 9 Drawing Sheets

Related U.S. Application Data

(60) Provisional application No. 62/636,010, filed on Feb. 27, 2018.

(51) Int. Cl.
*F04D 27/00* (2006.01)
*F04D 29/42* (2006.01)

(56) References Cited

U.S. PATENT DOCUMENTS

| | | | | |
|---|---|---|---|---|
| 5,820,150 | A | 10/1998 | Archer et al. | |
| 5,897,123 | A | 4/1999 | Cherney et al. | |
| 6,464,464 | B2 * | 10/2002 | Sabini | F04D 15/0066 318/432 |
| 6,561,718 | B1 | 5/2003 | Archer et al. | |
| 6,655,922 | B1 * | 12/2003 | Flek | F04D 29/669 73/1.37 |
| 6,860,332 | B1 | 3/2005 | Archer et al. | |
| 6,882,917 | B2 | 4/2005 | Pillar et al. | |
| 6,883,815 | B2 | 4/2005 | Archer | |
| 7,006,902 | B2 | 2/2006 | Archer et al. | |
| 7,055,880 | B2 | 6/2006 | Archer | |
| 7,163,381 | B1 | 1/2007 | Barak | |
| 7,387,348 | B2 | 6/2008 | Archer et al. | |
| 7,389,826 | B2 | 6/2008 | Linsmeier et al. | |
| 7,392,122 | B2 | 6/2008 | Pillar et al. | |
| 7,451,028 | B2 | 11/2008 | Pillar et al. | |
| 7,756,621 | B2 | 7/2010 | Pillar et al. | |
| 8,201,656 | B2 | 6/2012 | Archer et al. | |
| 8,333,390 | B2 | 12/2012 | Linsmeier et al. | |
| 8,839,902 | B1 | 9/2014 | Archer et al. | |
| 9,061,169 | B2 | 6/2015 | Linsmeier | |
| 9,492,695 | B2 | 11/2016 | Betz et al. | |
| 9,580,962 | B2 | 2/2017 | Betz et al. | |
| 10,144,389 | B2 | 12/2018 | Archer et al. | |
| 11,181,111 | B2 * | 11/2021 | Linsmeier | F04D 15/00 |
| 2014/0305664 | A1 * | 10/2014 | Lichtig | A62C 31/28 169/43 |
| 2016/0163177 | A1 | 6/2016 | Klicpera | |
| 2017/0050063 | A1 | 2/2017 | Shively et al. | |
| 2018/0215354 | A1 | 8/2018 | Linsmeier et al. | |
| 2018/0215597 | A1 | 8/2018 | Linsmeier et al. | |
| 2018/0289999 | A1 | 10/2018 | Kay et al. | |
| 2018/0293818 | A1 | 10/2018 | Linsmeier et al. | |
| 2018/0297597 | A1 | 10/2018 | Linsmeier et al. | |
| 2019/0234781 | A1 | 8/2019 | Mess et al. | |
| 2020/0256339 | A1 | 8/2020 | Stuart | |

* cited by examiner

FLUID DELIVERY SYSTEM HEALTH MONITORING SYSTEMS AND METHODS

CROSS-REFERENCE TO RELATED PATENT APPLICATIONS

This application is a continuation of U.S. patent application Ser. No. 16/286,007, filed Feb. 26, 2019, which claims the benefit of U.S. Provisional Patent Application No. 62/636,010, filed Feb. 27, 2018, both of which are incorporated herein by reference in their entireties.

BACKGROUND

Pump systems for a fire apparatus provide fluid to an output of the fire apparatus at an increased pressure and flow rate. Over time, the pump and components of the pump system may begin to degrade or wear, which limits the operational capabilities of the pump and the pump system.

SUMMARY

One embodiment relates to a fluid supply system for a fire apparatus. The fluid supply system includes a fluid delivery system including a pump, a sensor configured to acquire data regarding the fluid delivery system, and a processing circuit coupled to the sensor. The processing circuit is configured to determine a health level of the fluid delivery system based on the data and provide a notification in response to the health level not satisfying a threshold.

Another embodiment relates to a fluid supply system for a fire apparatus. The fluid supply system includes a pump and a processing circuit configured to perform a dead-head health test to determine a health level of the pump. To perform the dead-head health test, the processing circuit is configured to operate the pump at a predetermined output flow rate and a predetermined speed, dead-head the pump such that the predetermined output flow rate decreases to at least a threshold level while maintaining the predetermined speed, determine a dead-head pressure in response to dead-heading the pump, determine a pressure difference between the dead-head pressure and a predetermined dead-head pressure, compare the pressure difference to a predetermined pressure difference, and provide a notification in response to the pressure difference being greater than the predetermined pressure difference.

Still another embodiment relates to a fluid supply system for a fire apparatus. The fluid supply system includes a fluid delivery system, a first sensor, a second sensor, and a processing circuit. The fluid delivery system includes a pump, a fluid outlet configured to receive a pressurized fluid from the pump, and a valve positioned to selectively restrict flow of the pressurized fluid to the fluid outlet. The first sensor is configured to acquire first data regarding the fluid delivery system. The first sensor includes at least one of an ultrasonic sensor, a plurality of pressure sensors, a cavitation sensor, or a flow sensor. The second sensor includes a temperature sensor configured to acquire second data regarding a temperature of at least one of the pump, the pressurized fluid, or the fluid outlet. The processing circuit is configured to determine a health level of the fluid delivery system based on the first data, provide a first notification in response to the health level not satisfying a threshold, monitor the temperature based on the second data, and at least one of (i) provide a second notification, (ii) introduce cool fluid into the fluid delivery system, or (iii) slow down the pump in response to the temperature exceeding a temperature threshold.

The invention is capable of other embodiments and of being carried out in various ways. Alternative exemplary embodiments relate to other features and combinations of features as may be recited herein.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Before turning to the figures which illustrate the exemplary embodiments in detail, it should be understood that the application is not limited to the details or methodology set forth in the following detailed description or illustrated in the figures. It should also be understood that the phraseology and terminology employed herein is for the purpose of description only and should not be regarded as limiting.

According to an exemplary embodiment, a health monitoring system is configured to monitor various operating conditions of a fluid delivery system to determine the performance and health thereof. By way of example, the health monitoring system may monitor wear ring degradation within a pump of the fluid delivery system to determine the health thereof. By way of another example, the health monitoring system may monitor cavitation events within the pump to determine the health thereof. By way of still another example, the health monitoring system may implement a dead-head health test to monitor the health of the pump. By way of still another example, the health monitoring system may monitor the power input requirements and/or the flow output of the pump to quantify the health of the pump. By way of still yet another example, the health monitoring system may monitor temperatures within the fluid delivery system to prevent degradation and/or facilitate warning operators of elevated temperatures. By way of a further example, the health monitoring system may monitor operating performance of output valves to quantify the health thereof.

Figure 1:
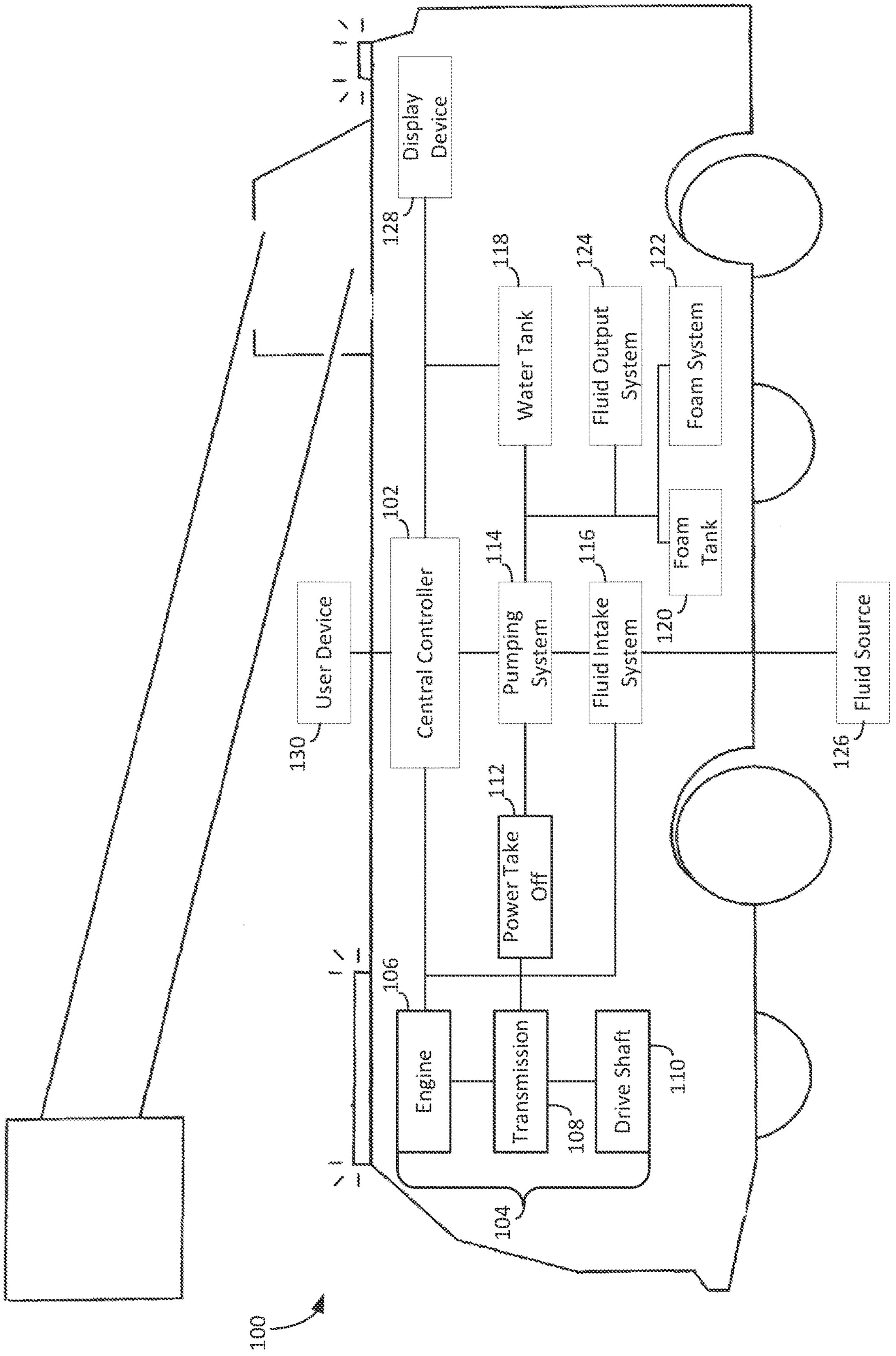
FIG. 1 is a schematic diagram of a response vehicle, according to an exemplary embodiment.

Referring generally to FIG. 1, a vehicle 100 is shown according to an exemplary embodiment. The vehicle 100 is shown as a firefighting vehicle, which is configured to deliver a firefighting agent, such as water, foam, and/or any other fire suppressant to an area of interest (e.g., building, environmental area, airplane, automobile, another firefighting vehicle, etc.) using a vehicle fluid delivery system. The vehicle 100 generally includes a chassis, a cab supported at a front portion of the chassis, a body supported by the chassis rearward of the cab, a drive system for operating the vehicle 100 and/or one or more systems thereof, and a fluid delivery system. The fluid delivery system generally includes a fluid supply system, a fluid discharge system, a fluid conduit system, and a pump system for pressurizing and/or displacing a firefighting fluid or other agent.

As shown in FIG. 1, the vehicle 100 includes a control system, shown as central controller 102. By way of overview, the central controller 102 includes a plurality of interfaces facilitating the central controller 102 receiving and transmitting signals from various subsystems, shown as vehicle subsystems 104-124, a display, shown as display 128, and a user device 130 by way of a wired and/or a wireless connection. As such, the central controller 102 facilitates the control of various subsystems 104-124 of the vehicle 100 by way of various means. In the exemplary embodiment shown, the central controller 102 is further configured to establish connections with various devices (e.g., the user device 130 described below) and transmit various communications (e.g., instructions, data, and the like) to those external devices. A more detailed description of the central controller 102 will be provided below in relation to FIG. 4.

The vehicle 100 includes a drive system, shown as drive system 104. The drive system 104 provides power to operate the vehicle 100 and certain other subsystems 106-124 of the vehicle 100. Drive system 104 generally comprises a power source or prime mover and a motion transfer device. The prime mover generally generates mechanical energy (e.g., rotational momentum) from an energy source (e.g., fuel). Examples of suitable prime movers include, but are limited to, an internal combustion gas-powered engine, a diesel engine, a turbine, a fuel cell driven motor, an electric motor, or any other type of motor capable of providing mechanical energy. Any of the above mentioned prime movers may be used alone or in combination with one or more additional power sources (as in a hybrid vehicle) to provide mechanical energy. In the example shown, the prime mover includes an internal combustion engine 106.

The motion transfer device is coupled to a power output of the prime mover and is configured to transfer the mechanical energy produced by the prime mover to various other elements of the vehicle 100. In the example shown, the motion transfer device includes a transmission 108. The transmission 108 may be any of a variety of suitable transmissions (e.g., standard, hybrid, automatic, etc.). The transmission 108 may include an input shaft coupled to the engine 106 and at least one output shaft. A gear system including a plurality of ratio gears may selectively engage with a gear coupled to the input shaft to provide a multi-ratio output. The transmission 108 may include a plurality of clutches so as to selectively engage various gears to produce a desired rotational output. In the exemplary embodiment shown, the transmission 104 includes a transmission sub-controller (not shown) configured to receive various control signals from the central controller 102 and produce an output control signal to control the mode and/or gear ratio of the transmission 108. For example, the output control signal may control the operation of various solenoid valves coupled to various clutches to control the operating gear ratio of the transmission 108. As will be described below, the output control signal of the transmission sub-controller may be based on various inputs (e.g., an operator input 430, a sensor signal received at the fluid intake system interface 436, etc.) produced by the vehicle 100. The output of the transmission 108 may be coupled to the a drive shaft 110 of the vehicle 100 to provide mechanical energy to various motive members (e.g., wheels via a differential or the like) of the vehicle 100 to propel the vehicle 100 in response to an input (e.g., a throttle input) being provided to the engine 106.

The vehicle 100 further includes a power take off ("PTO") 112 configured to selectively couple the output of the transmission 108 to the pumping system 114 of the vehicle 100. In some embodiments, the PTO 112 includes a clutch (not shown) that selectively couples the output of the transmission 108 to the pumping system 114 via the PTO 112 (e.g., when the operator selects a "pumping mode" for the vehicle 100). In some embodiments, such a clutch may only be engaged when the transmission 108 has been placed in a certain mode of operation (e.g., neutral) and/or when the vehicle 100 is stationary. In some embodiments, the PTO 112 includes an axillary gearbox including a plurality of gear ratios to alternate the rate at which rotational energy is provided to the pumping system 114. The PTO 112 may include a PTO sub-controller (not shown) configured to monitor the mode of operation of the PTO 112 (e.g., the current gear ratio, the engagement of the clutch, etc.) and receive various control signals from the central controller 102 to control the operation of the PTO 112. In some embodiments, the PTO 112 is integrated with or otherwise a part of the transmission 108.

The pumping system 114 is configured to draw fluid from a fluid source 126 via the fluid intake system 116 for use by the vehicle 100. Pumping system 114 may include any mechanism that can use mechanical energy to create a pressure differential. For example, in one embodiment, the pumping system 114 includes a liquid pump coupled to the PTO 112. The pumping system 114 may also be configured to selectively provide water to either the water tank 118 or the fluid output system 124. The water tank 118 may be any structure capable of holding water, such as a vessel, container, chamber, volume, etc.

The fluid intake system 116 is configured to interface with the fluid source 126 and provide fluid therefrom to the pumping system 114. In some embodiments, the fluid intake system 116 is integrated with a suction inlet of the pumping system 114. In the example embodiment shown, the fluid intake system 116 is configured to measure an intake pressure of the fluid from the fluid source 126 to provide an input to the central controller 102, as described herein. A more detailed explanation of the fluid intake system 116 will be provided below in relation to FIG. 2.

Still referring to FIG. 1, the vehicle 100 further includes a foam system 122. In the example shown, the foam system 122 is placed downstream of the pumping system 114. Fluid drawn by the pumping system 114 from the fluid source 126 or the water tank 118 may be combined with a foamant stored in the foam tank 120. In some embodiments, the foam system 122 includes a pump separate from the pumping system 114 and an associated controller (not shown). The pump may draw foamant stored in the foam tank 120 and force the foamant through a check valve into a port in fluidic communications with an outlet of the pumping system 114 prior to the fluidic output reaching the output system 124. In some embodiments, the rate at which foamant is drawn from the foam tank 120 depends on an input received from an operator or other user (e.g., from the central controller 102 described below). Additionally, the central controller 102 may selectively open or close the check valve of the foam system 120 depending on the mode of operation of the pumping system 114, as described below.

The fluid output system 124 is configured to direct fluid provided by the pumping system 114 (or a combination of outputs from the pumping system 114 and the foam system 122) to an area of interest. In the exemplary embodiment shown, the fluid output system 124 is configured to provide input signals to the central controller 102. The input signals may be generated via an input received from a user or by a sensing device configured to detect at least one characteristic of a fluid output being emitted by the fluid output system 124. A more detailed description of the fluid output system 124 will be provided below in relation to FIG. 3.

Still referring to FIG. 1, the vehicle 100 further includes a display, shown as display 128. Display 128 may be, for example, a display (e.g., a CANlink® CL-711 display manufactured by HED Inc., etc.) having an interface (e.g., a touchscreen, a display with a row of buttons disposed along one side thereof, etc.) that receives an input from a user. Display 128 may support any type of display feature, such as a flipbook-style animation, or any other type of transition feature. Display 128 may generally provide a plurality of navigation buttons that allow a user to select various displays and other options via touch. Display 128 may further, upon detection of a sensor signal captured by any of the vehicle subsystems 104-124, generate a graphical representation of the sensor signal. For example, if a signal is received from a water level sensor of the water tank 118, a water level screen may be displayed that informs the operator of the current water level. Display 128 may have a wired or wireless connection with other response vehicle subsystems and/or with remote devices.

The display 128 may be configured to display a graphical user interface, an image, an icon, a notification, and indication, and/or still other information. In the exemplary embodiment shown, the display includes a graphical user interface configured to provide general information about the vehicle 100 captured by the various sensing devices included in the various vehicle subsystems 104-124. Through such an interface, the operator may be able to view various fluid levels of the vehicle 100 (e.g., fuel level, water tank level, transmission fluid level, foam level, etc.), tire pressures, the mileage of the vehicle 100, battery voltage levels, and the like.

The display 128 may include any number of supporting buttons and other tactile user inputs to support interaction between a user and the display. For example, a plurality of push buttons may be located next to or below the display to provide the user with further options. It should be understood that the configuration of the display 128 may vary without departing from the scope of the present disclosure.

The display 128 may include or support various technologies. For example, the display 128 be a touchscreen display and may be separated into any number of portions (e.g., a split-screen type display, etc.). For example, a first portion of the screen may be reserved for one particular type of display (e.g., warnings and alerts, etc.), while another portion of the screen may be reserved for general vehicle information (e.g., speed, fuel level, etc.). The display 128 may be configured to handle any type of transition, animation, or other display feature that allows for ease of access of information on the display.

In one embodiment, the display 128 is coupled to a USB input, allowing the display software to be updated. For example, such updates may include updating the maps stored on the display (e.g., to improve navigation features, etc.). Further, custom files may be downloaded to the display (e.g., custom logos, images, text, etc.) to personalize the display 128 for use in the vehicle 100.

The display 128 may include any number of video inputs (e.g., from one or more cameras located on the vehicle 100, etc.). For example, the display 128 may be capable of receiving four video inputs and may display up to four video inputs simultaneously on the display 128. The display 128 may be configured to detect when a camera feed is up, therefore determining when to display a video input on the display or not (e.g., not displaying a blank or blue screen, etc.).

The user device 130 is a device associated with a user. The user may include any individual having any sort of association with the vehicle 100. In various other embodiments, the user may include emergency response personnel (e.g., firefighters, management personnel, and the like), government inspectors, and the like. The user device 130 may include any type of device capable of establishing a connection and receiving information from the central controller 102. As such, the user device 130 may include wearable devices such as a smart watch or a mobile computing device such as a smart phone, tablet, personal digital assistant, and laptop computing device. Alternatively, the user device 130 may include a stationary computing system such as a desktop computer located, for example, at the fire station associated with the vehicle 100.

Figure 2:
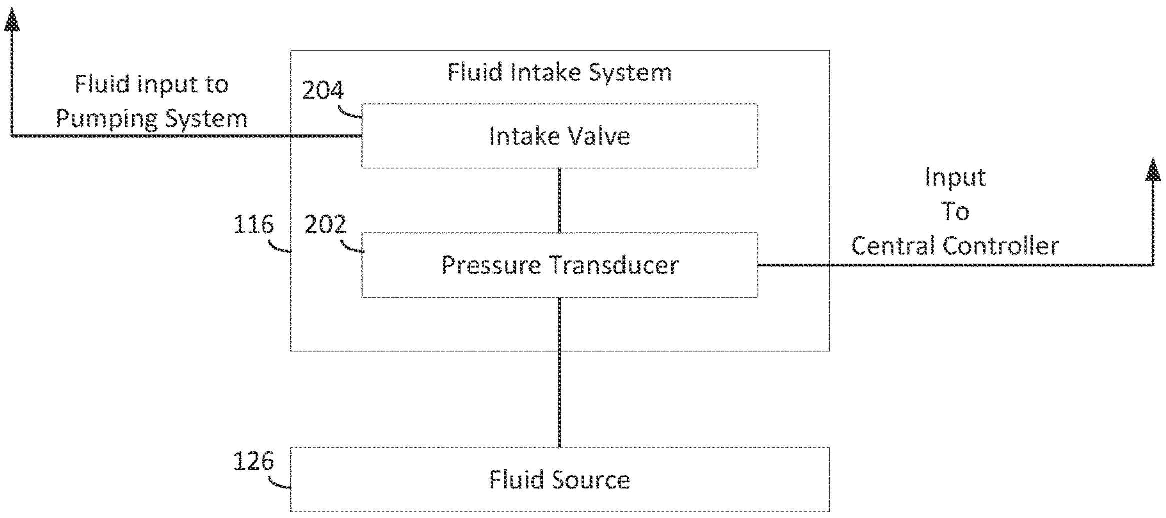
FIG. 2 is a schematic block diagram of a fluid intake system of the response vehicle of FIG. 1, according to an exemplary embodiment.

Turning now to FIG. 2, the fluid intake system 116 is described in more detail. In the example shown, the fluid intake system 116 includes a pressure transducer 202 and an intake valve 204. The intake valve 204 is configured to control a fluid flow from the fluid source 126. For example, in some embodiments the intake valve 204 may receive various control signals from the central controller 102. In response, the intake valve 204 may open or close by an amount indicated by the control signals so as to control fluid input from the fluid source 126 independent of the energy applied by the pumping system 114. In some embodiments, the intake valve 204 may detect the status of the connection of any hoses (e.g., intake lines) to the central controller 102. The pressure transducer 202 is generally a pressure transducer (e.g., a vacuum transducer) configured to determine intake pressure and to communicate a signal representing intake pressure to the central controller 102. The pressure transducer 202 may communicate the signal to the central controller 102 via a wired or wireless connection. In some embodiments the pressure transducer 202 is integrated with the intake valve 204.

Figure 3:
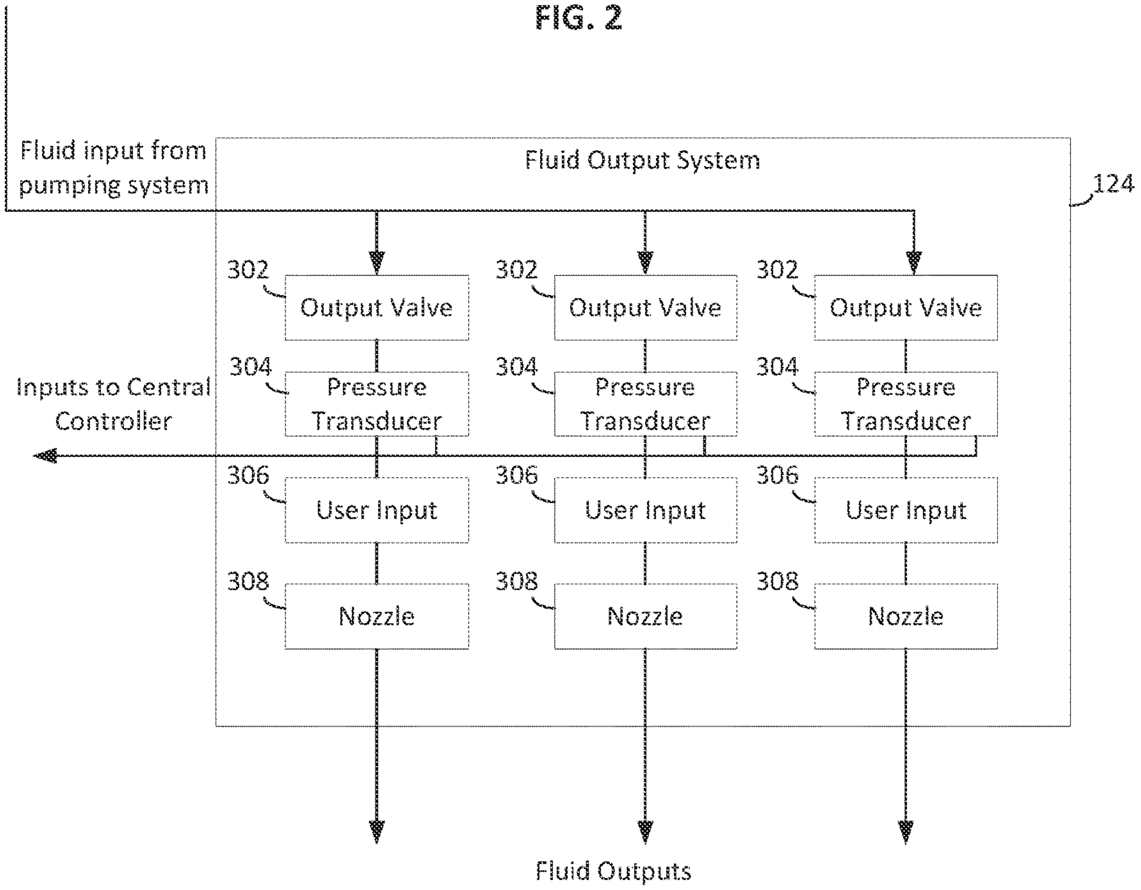
FIG. 3 is a schematic block diagram of a fluid output system of the response vehicle of FIG. 1, according to an exemplary embodiment.

Turning now to FIG. 3, the fluid output system 124 is described in more detail. Generally, the fluid output system 124 may be or refer to any of a number of liquid discharge systems including a hose or line network coupled to a pump panel. As shown in FIG. 3, the fluid output system 124 includes three outlets. Each outlet includes an output valve 302, a pressure transducer 304, a user input 306, and a nozzle 308. The output valves 302 are configured to control various characteristics of a fluid flow directed to an area of interest via the nozzle 308. As such, the output valve 302 may have a plurality of positions (e.g., closed, open, and various levels between). In some embodiments, the output valve 302 may include a user input 306 configured to receive various inputs form an output operator. For example, the user input 306 may include a knob enabling the user to indicate a preference as to the level of openness of the output valve 302 to control characteristics for the flow emitted from the nozzle 308. In another example, the user input 306 may enable the operator select a desired fluid output pressure. In some embodiments, such inputs may be transmitted (e.g., by way of a wireless transceiver or a wired connection) to the central controller 102 and used to control various other vehicle subsystems 104-124 as described below.

The pressure transducer 304 is configured to measure a water pressure level at the output. In the exemplary embodiment shown, the pressure transducer 304 is similar to the transducer 202 discussed above. As such, the pressure transducer 304 may measure the pressure at the output and transmit an input signal indicative of the pressure level back to the central controller 102. The nozzle 308 may a deluge gun, a water cannon, a deck gun, or any other piece of equipment capable of controlling the direction or other characteristics (e.g., spray type, spray velocity, etc.) of a fluid flow emitted from the output.

Figure 4:
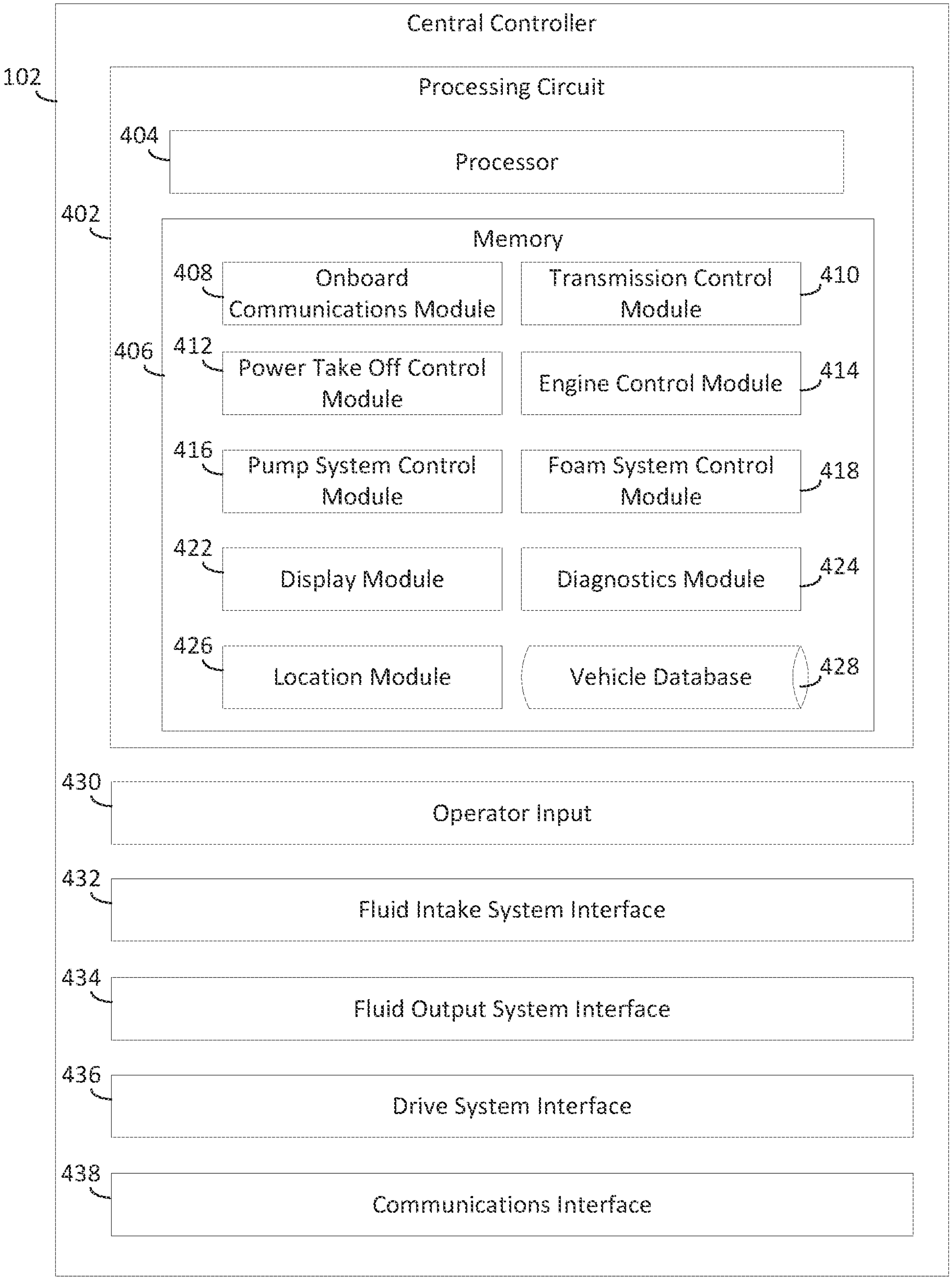
FIG. 4 is a block diagram of a central controller of the response vehicle of FIG. 1, according to an exemplary embodiment.

Referring now to FIG. 4, a more detailed view of the central controller 102 of the vehicle 100 of FIG. 1 is shown, according to an exemplary embodiment. The central controller 102 includes a processing circuit 402 including a processor 404 and a memory 406. Processor 404 may be a general purpose or specific purpose processor, an application specific integrated circuit (ASIC), one or more field programmable gate arrays (FPGAs), a group of processing components, or other suitable processing components. Processor 404 may be configured to execute computer code or instructions stored in memory 406 or received from other computer readable media (e.g., CDROM, network storage, a remote server, etc.) to perform one or more of the processes described herein. Memory 406 may include one or more data storage devices (e.g., memory units, memory devices, computer-readable storage media, etc.) configured to store data, computer code, executable instructions, or other forms of computer-readable information. Memory 406 may include random access memory (RAM), read-only memory (ROM), hard drive storage, temporary storage, non-volatile memory, flash memory, optical memory, or any other suitable memory for storing software objects and/or computer instructions. Memory 406 may include database components, object code components, script components, or any other type of information structure for supporting the various activities and information structures described in the present disclosure. Memory 406 may be communicably connected to processor 404 via processing circuit 402 and may include computer code for executing (e.g., by processor 404, etc.) one or more of the processes described herein.

The memory 406 is described below as including various modules. While the exemplary embodiment shown in the figures shows each of the modules 408-426 as being separate from one another, it should be understood that, in various other embodiments, the memory may include more, less, or altogether different modules. For example, the structures and functions of one module may be performed by another module, or the activities of two modules may be combined such that they are performed by only a signal module. Additionally, it should be understood that any of the functionalities described as being performed by a module that is a part of the central controller 102 below may also be performed by a separate hardware component having its own processors, network interfaces, etc.

As shown in FIG. 4, the memory 406 includes an onboard communications module 408. Onboard communications module 408 is configured to facilitate wireless communications with user devices and with other vehicles via communications interface 438 (e.g., a transceiver, etc.). Communications interface 438 may support any kind of wireless standard (e.g., 802.11 b/g/n, 802.11a, etc.) and may interface with any type of mobile device (e.g., laptop, tablet, smartphone, etc.) having Wi-Fi capability. Communications interface 438 may further facilitate wireless communications with an external global positioning system (GPS). Onboard communications module 408 may be any type of Wi-Fi capable module (e.g., a CL-T04 CANect® Wi-Fi Module manufactured by HED Inc., etc.) configured to support wireless communications with the mobile devices and other response vehicles. In one embodiment, the user devices communicate with the response vehicles via Wi-Fi. In other embodiments, the communications between the user devices and/or response vehicles may be supported via CDMA, GSM, or another cellular connection. In still other embodiments, another wireless protocol is utilized (e.g., Bluetooth, Zigbee, radio, etc.).

Onboard communications module 408 may include various security features for providing secure communications between the central controller 102 and the user devices 130. Such a module may further include other response vehicle-related features that may be used in the systems and methods disclosed herein (e.g., diagnostics features, navigation features, etc.). For more detail regarding the onboard communications module, see granted U.S. Pat. No. 10,144,389, titled "Response Vehicle Systems and Methods," which is incorporated herein by reference in its entirety.

In the example embodiment shown, the central controller 102 establishes a connection with the user device 130 via the communications interface 438 as controlled by the onboard communications module 408. For example, the user may approach the vehicle 100 with the user device 130. The user device 130 may pick up a wireless signal broadcasted by the communications interface 438. In response, the user may provide an input to the user device 130 to establish a connection to the central controller 102 by inputting credentials (e.g., a password or the like) in the user device 130. In response to receiving such an input, the onboard communications module 408 may cause the processor 404 of the central controller 102 to authenticate the user by comparing the input credentials to credentials stored in the central controller 102 (e.g., in the vehicle database 428). Having authenticated the user, various encryption keys and the like may be exchanged between the user device 130 and the central controller 102 to establish a secure connection between the central controller 102 and the user device 130. Such a connection may support any of the communications between the user device 130 and the central controller 102 described herein. For example, various display datasets in the form of webpages may be transmitted by the central controller 102 to the user device 130 such that the datasets are viewable via a web browser on the user device 130. Such webpages may enable the user to provider various inputs to the central controller 102 described herein.

As shown in FIG. 4, the central controller 102 includes an operator input 430. The operator input 430 is configured to receive inputs from an operator or other personnel and provide various inputs to vehicle subsystems 104-124. The operator input may include one or more buttons, knobs, touchscreens, switches, levers, joysticks, pedals, or handles and associated hardware and software combinations (e.g., analog to digital converters and the like) to convert operator interactions with such components into readable control signals. For example, the operator input 430 may include a button enabling the operator to change the operating mode of the drive system 104 so as to provide mechanical energy to the pumping system 114 via the transmission 108 (e.g., switch the vehicle 100 from a "driving mode" into a "pumping mode"). In another example, the operator input 430 may also include an accelerator pedal enabling the operator to provide an input signal to the engine 106 via the drive system interface 436.

As shown in FIG. 4, the central controller 102 includes interfaces 432 and 434 to the fluid intake system 116 and the fluid output system 124. Interfaces 432 and 434 communicably couple the central controller 102 to the fluid output system 124 and fluid intake system 116. Interfaces 432 and 434 may include a jack or other hardware for physically coupling a line or connector to the central controller 102. Alternatively, the interfaces 432 and 434 may be integrated with the communications interface 438, and such signals may be transmitted and received wirelessly. In any event, interfaces 432 and 434 receive command signals from the processor 404 and forward control signals to the valves 204 and 302 of the systems 116 and 120 to control characteristics of fluid being received by the vehicle 100 via the pumping system 114 and emitted via the output system 120. In some embodiments, such command signals may be generated by the processor 404 in response to various inputs received from the operator or other personnel. For example, the operator (e.g., via the display 128) may indicate a preference as to the state of the intake valve 204. In response, the processor 404 may generate an intake control signal and transmit the control signal to the intake valve 204 via the interface 436.

Additionally, the central controller 102 receives sensor signals measured by various sensors (e.g., the pressure transducers 202 and 304). For example, a pressure signal from the pressure transducer 202 indicating a pressure level of the fluid source 126 may be received from the fluid intake system 116 via the fluid intake system interface 434. As will be described below, such a signal may be used to generate a control signal transmitted to the drive system 104 via the drive system interface 436. In another example, an input may be received from the fluid output system 124 (e.g., a firefighter may indicate a preference as to the pressure of fluid to be emitted from a particular nozzle 306). As will be described below, such an input may be used by the central controller 102 to control the pumping system 114 so as to generate the desired output.

As shown in FIG. 4, the central controller 102 further includes a drive system interface 436. The drive system interface 436 is shown as an interface for communicably coupling the engine 106, the transmission 108, and the PTO 112 to the central control system 102. As such, the drive system interface 436 may be any hardware and/or software compatible the various connections between the central controller 102 and these components. In some embodiments, the vehicle 100 includes various data lines (not shown) connecting the various components herein. Accordingly, the interfaces 432-436 may include a jack, a solder point, and/or other hardware for physically coupling the controller 102 to the engine 106, the transmission 108, and/or the PTO 112. Additionally, the drive system interface 436 may include communications hardware/software, a digital to analog converter, an analog to digital converter, a circuit for interpreting signals representing RPM, transmission gear level, transmission operating mode, and/or another suitable component. Similar to the interfaces 432 and 434 discussed above, the drive system interface 436 is configured to provide various control signals to the engine 106, the transmission 108, and the PTO 112. As described below, such control signals may be based on various inputs received via the operator inputs 430 and sensor signals received via the interfaces 432 and 434.

As shown in FIG. 4, the memory 406 includes a transmission control module 410 configured to control the state of operation of the transmission 108. The transmission control module 410 is structured to cause the processor 404 to generate and transmit control signals to the transmission 108 by way of the drive system interface 436. Such control signals may be based on various inputs received by the central controller 102. For example, via the operator input 430 (e.g., via the display 128), the operator may indicate an effective gear ratio preference for the transmission 108. Upon receipt of such an input, the processor 404 may execute the transmission control module 410, which may include a plurality of lookup tables including various instructions for generating a transmission control signal based on the input. Accordingly, the processor 404 may retrieve the appropriate set of instructions based on the received input, generate a control signal based on the retrieved instructions, and transmit the control signal to the transmission 108 by way of the drive system interface 436. Upon receipt of the control signal, a sub-controller of the transmission 108 may activate a solenoid valve so as to engage a clutch corresponding to the desired gear ratio.

In other examples, the transmission control module 410 causes the processor 404 to generate control signals based on various other inputs. One such input may be produced via the location module 426 described below. For example, upon a determination that the vehicle 100 is within a predetermined distance of a fluid source 126 having a positive output pressure (e.g., a fire hydrant or the like), the processor 404 may provide a location input to the transmission control module 410. Such an input may cause the processor 404 to execute certain program logic of the transmission control module 410. This program logic may cause the processor 404 to identify the operational state of various vehicle subsystems such as the PTO 112 (e.g., whether the vehicle 100 has been placed into a pumping mode by the engaging of a clutch to provide mechanical energy to the pumping system 114), the engine 106 (e.g., the RPM level), and the transmission 108 (e.g., the current operation gear ratio). In some embodiments, upon determining that the vehicle 100 has been placed into pumping mode (e.g., via an input provided from the operator inputs 430), the engine 106 is operating at an RPM below a certain threshold, and that the transmission 108 is operating in a default pumping gear ratio (e.g., 1:1), the program logic may further cause the processor 404 to produce a control signal and transmit the control signal to the transmission 108 by way of the drive system interface 436. For example, the processor 404 may access a fluid source pressure lookup table and retrieve a set of instructions based on the output pressure of the fluid source 126 (as identified by the information included in the location module 426) to generate a transmission control signal. The transmission control signal may cause the transmission 108 to down-shift the transmission 108 to a higher gear ratio so as to increase the rate of operation of the engine 106 while maintaining the amount of mechanical energy provided to the pumping system 114 via the PTO 112.

Another input to the transmission control module 410 may be produced by the processor 404 in response to a sensor signal received from the fluid intake system 116. For example, the pressure transducer 202 may produce a signal indicative of the pressure from the fluid source 126 at the intake valve 204. If the indicated pressure is above a predetermined threshold, a pressure-based input may be provided to the transmission control module 410. Such an input may cause the processor 404 to execute certain program logic of the transmission control module 410 so as to cause the processor 404 to perform similar to those discussed above with respect to the location input.

As shown in FIG. 4, the memory 406 further includes a PTO control module 412 configured to control the operation of the PTO 112 so as to place the vehicle 100 into a pumping mode and/or a driving mode. In some embodiments, the PTO control module 412 is configured to switch the control system 102 from a driving mode to a pumping mode in response to various inputs. For example, the operator may select a pumping mode via the operator inputs 430, or an external user may provide such a command via a secure connection with a user device 130 and, in response, the PTO control module 412 may cause the processor 404 to transmit a control signal to the PTO 112 to cause energy from the transmission 108 to be directed to the pumping system 114. For example, the control signal may activate a solenoid valve of the PTO 112 so as to engage a clutch to couple the PTO 112 with an output shaft of the transmission 108. A similar input may be received via the location module 426. For example, if the processor 404 determines that the vehicle 100 is stationary and that the location of the vehicle 100 is within a predetermined distance of a destination, the vehicle 100 may be automatically placed into the pumping mode.

As shown in FIG. 4, the memory 406 further includes an engine control module 414 configured to control the operation of the engine 106. Similar to the transmission control module 410, the engine control module 414 may cause the processor 404 to access a plurality of lookup tables in response to various inputs. For example, the operator may press an accelerator pedal of the operator input 430 so as to provide a throttle input to the central controller 102. In response, the processor 404 may execute the engine control module 414, access a lookup table to convert the input to a throttle signal, and transmit a corresponding control signal to the engine 106 so as to cause the engine 106 to operate at the preferred rate.

The engine control module 414 is also configured to control the engine 106 when the vehicle 100 is placed into pumping mode. When in pumping mode, the engine control module 414 may cause the processor 404 to control the operational rate of the engine 106 so as to provide sufficient mechanical energy to the pumping system 114 to provide a desired fluid output at the fluid output system 124. In some embodiments, the operator (e.g., via the display 128) or other user (e.g., a user of the fluid output system 124 at the point of fluid output) may provide inputs as to a preferred output pressure for fluid at the fluid output system 124, causing the processor 404 to control the operational rate of the engine 106 to maintain the desired output pressure. The engine control module 414 may also cause the processor 404 to control the operational rate of the engine 106 in response to various sensor signals measured by the fluid intake system 116 and fluid output system 124. For example, in response to a decrease in the output measured by the transducers 304 of the fluid output system 124, the processor 404 may cause the operational rate of the engine 106 to increase so as to maintain the output pressure at a previous level. Similar input signals may also be provided a sensor of the pumping system 114 (e.g., a transducer measuring the pressure of the output provided to the fluid output system 124).

The control signals produced for the engine 106 via the engine control module 414 may vary depending on the state of various other vehicle subsystems. For instance, if the vehicle 100 has been placed into a pumping mode, the control signals produced may be different than if the vehicle 100 is placed into driving mode. As such, the dependence of the engine control signals on the current state of the transmission 108 (e.g., the current gear ratio) may vary depending on whether the vehicle 100 is placed into pumping mode or driving mode.

As shown in FIG. 4, the memory 406 further includes a pump system control module 416. In various example embodiments, the pump system control module 416 may cause the processor 404 to control various components of the pumping system 114. For example, in some embodiments, the pumping system 114 includes a secondary power source (e.g., other than the engine 106) such as an electrical motor. The pump system control module 416 may cause the processor 404 to control the operation of the secondary power source in response to the operational rate of the engine 106, the output pressure of the pumping system 120, the intake pressure at the fluid intake system 116, and so on.

Additionally, the pump system control module 416 may also change various characteristics of the fluid outputs of the pumping system 114 (e.g., the output provided to the fluid output system 124) depending on the selected mode of operation for the pumping system 114. In the example embodiment disclosed herein, the pumping system 114 may be placed into various modes of operation based on various inputs. For example, the operator (via the operator input 430) or other user (e.g., via a secure connection with a user device 130) may provide an input to place the pumping system 114 into various modes depending on the type of fire that the vehicle 100 is being used to combat. In one embodiment, the pumping system 114 may be placed into three different modes: a vehicle fire mode, a vegetation fire mode, and a relay pumping mode. In the vehicle fire mode, the foam system 122 is activated such that foamant from the foam tank 120 is introduced into the outlet flow of the pumping system 114, and the pumping system 114 is controlled so as to provide an output to the fluid output system 124 at a first output pressure. Accordingly, the pump system control module 416 may control various valves in the pumping system 114 based on the operational level of the engine 106 so as to produce an output at the first output pressure. In the vegetation fire mode, the foam system 122 is not activated and the pumping system 114 is controlled so as to provide an output at a second output pressure to the fluid output system 124. The second output pressure may vary from the first output pressure.

In the relay pumping mode, the vehicle 100 serves to deliver fluid to another vehicle. In other words, the output of the pumping system 114 serves as a fluid source 126 for the other vehicle. Given this, rather than providing a fluid output to the various nozzles 308 of the output system 124 shown in FIG. 3, the pumping system 114 may deliver fluid to a single outline line. Additionally, the pump system control module 416 may configure the pumping system 114 to produce an output initially at a third output pressure that is lower than the first output pressure and the second output pressure discussed above to prevent problems at the intake system (e.g., similar to the intake system 116) of the other vehicle. The output pressure produced by the pumping system 114 may increase a predetermined rate until the inlet pressure at the other vehicle (e.g., as measured by a pressure transducer in a fluid intake system similar to the fluid intake system 116) reaches a target level.

Additionally, when in relay pumping mode, the pump system control module 416 may control the operation of the vehicle 100 based on various inputs received from the other vehicle to which the vehicle 100 is connected. For example, the other vehicle may transmit such inputs to the central controller 102 via a secure connection established in a way similar to the secure connection with the user device 130 discussed above. The inputs may include, for example, the output pressure at the output system (e.g., similar to the output system 124) of the other vehicle, the RPM of the engine of the other vehicle, the intake pressure at a fluid intake system (e.g., similar to the fluid intake system 116), and the like. In any event, if the central controller 102 receives an indication that the other vehicle has a diminished demand for fluid from the vehicle 100 (e.g., as indicated by a decrease in the RPM rate, or an output pressure of the other vehicle), the pump system control module 416 may cause the processor 404 to produce a control signal to reduce the output pressure produced by the pumping system 114 (e.g., by decreasing the RPM of the engine 106, by adjusting the intake valve 204 of the fluid intake system 116, adjusting an output valve of the pumping system 114, etc.). As such, undue pressure on the intake system of the other vehicle is beneficially avoided.

As shown in FIG. 4, the memory 406 further includes a foam system control module 418 configured to control the operation of the foam system 122. As such, the foam system control module 418 may be structured to cause the processor 404 to produce various control signals to actuate various elements of the foam system 122 (e.g., electric check valve, a power source for the foam system 122, etc.) based on various inputs. For example, upon the vehicle 100 being placed in the vehicle fire mode discussed above, a control signal may open the check valve of the foam system 122 and cause a pump associated with the foam system 122 to draw foam from the foam tank 120 at a predetermined rate. Additionally, the operator or other user may input preferences as to a preferred level of foam output to control the pump of the foam system 122.

As shown in FIG. 4, the memory 406 further includes a display module 422. The display module 422 is structured to cause the processor 404 to generate various displays for viewing by the display 128. In the example embodiments shown, the displays presented via the display 128 may vary depending on various inputs received from the operator or other user. For example, the display module 422 may include a menu navigation module (not shown). The menu navigation module may present the operator with a menu interface presenting various options to the operator. Each option may include a selectable widget configured to cause the display module 422 to generate and/or retrieve a particular display in response to the operator's selection of the widget (e.g., by the operator touching the screen of the display 128 in a position that corresponds to a particular widget).

For example, the menu interface may include vehicle operation widget. In response to the operator selecting the operation widget, the display module 422 may cause the processor 404 to present the operator with the status of various subsystems of the vehicle 100. Such a display may, for example, identify current operational status of the vehicle 100 (e.g., whether the vehicle has been placed into a pumping mode or a driving mode), identify a mode of operation of the pumping system 114 (e.g., the pumping system 114 may be placed in either an RPM mode, where the user controls the pump based a RPM level of the engine 106, or a pressure mode, where the operator can select an output pressure for the pumping system 114 at either the fluid output system 124 or the intake of the fluid output system 124), identify vehicle driveline states (e.g., a current RPM of the engine 106), and/or provide various descriptors of the operation of the pumping system 114 (e.g., current discharge pressure at various nozzles 308 of the fluid output system 124, intake pressures measured by the fluid intake system 116, intake vacuum(s), water temperatures, water levels in the water tank 118, foam levels, etc.). While display module 422 is described with reference to the vehicle 100 in FIG. 4, it should be understood that display module 422 may provide the same or a similar type of interface, with the same, similar, or different types of features (e.g., touch-screen input capability, etc.) to the user devices 130 as well.

As shown in FIG. 4, the memory 406 includes a diagnostics module 424. The diagnostics module 424 is structured to enable the processor 404 to process data received via the interfaces 432-436 discussed above. For example, via the diagnostics module 424, the processor 404 may compare the data received from various sensors on the vehicle 100 to various baseline values, and generate a diagnostics report. For example, upon the central controller 102 receiving a signal indicating a current RPM level of the engine 106 and a current gear ratio of the transmission, the diagnostics module 410 may interface with the display module 422 to produce graphical representations of such signals for presentation to the operator via the display 128.

In the example embodiment shown, the diagnostics module 424 is also specifically configured to monitor the operation of the pumping system 114. In this regard, the diagnostics module 424 may include a data logger configured to store various data points measured by various sensors capturing data regarding the operation of the pumping system 114. For example, the diagnostics module 124 may monitor the pressure of the output of the pumping system 114 as a function of the RPM of the engine 106. The diagnostics module 424 may also compare the relationship between these values (e.g., the rate of change in the RPM versus the rate of change of the output pressure of the pumping system 114) with a baseline relationship (e.g., gathered at a routine performance check) so as to determine if the performance of the pumping system 114 is in decline. If so, the diagnostics module 424 may interface with the display module 422 to generate a pumping system alert. Similarly, an alert may be presented to the operator if the water tank 118 has a level of water below a predetermined threshold or if the intake pressure (e.g., as measured by the fluid intake system 116) is above a predetermined threshold. Additionally, similar to the subsystem displays discussed above, the diagnostics module 424 may further interface with the display module to provide graphical representations of various other aspects of the operation of the pumping system 114 (e.g., discharge pressures, intake pressures, intake vacuum, water temperatures, etc.).

As shown in FIG. 4, the memory 406 includes a location module 426. The location module 426 is configured to provide navigational assistance to the vehicle 100. In this regard, the location module 426 may include datasets containing information pertaining to routes to various destinations. A destination may be provided to the vehicle 100 (e.g., via a user device 130), and the processor 404 may identify a route to the destination using the information included in the location module 426. Step-by-step navigation instructions may be presented to the operator of the vehicle 100 to assist the vehicle 100 with timely arriving at the indicated destination.

Additionally or alternatively, the location module 426 may store various datasets pertaining to various locations of interest to personnel (e.g., commanders, firefighters, and the like) associated with the vehicle 100. For example, the location module 426 may store information pertaining to the location of various fluid sources 126. The information may include location coordinates for various fluid sources 126, and identify the output pressure of the identified fluid sources 126. Further, program logic included in the location module 426 may cause the processor 404 to compare the current location of the vehicle 100 (e.g., as measured by a GPS system within the vehicle 100) with the location coordinates of the fluid sources 126 to determine if the vehicle 100 is within a predetermined distance (e.g., the length of an inlet line of the fluid intake system 116) of one of the fluid sources 126. Upon such a determination, an input may be provided to the transmission control module 410, as described herein.

As shown in FIG. 4, the memory 406 also includes a vehicle database 428 configured to store various forms of information pertaining to the vehicle 100. The vehicle database 428 may include, for example, telemetric data captured by the various sensors discussed above. For example, as discussed above, the diagnostics module 424 may include a data logger or the like that stores any sensor signals received from the drive system 104, the PTO 112, the pumping system 114, the fluid intake system 116, the water tank 118, the foam system 122, and/or the fluid output system 124. As such, the vehicle database 428 may include a plurality of telemetry datasets, with each dataset corresponding to a different sensor. Each dataset may include a plurality of entries, with each entry including a sensor signal value and a time stamp. Additionally or alternatively, the vehicle database 428 may store the vehicle subsystem reports generated via the diagnostics module 424.

In some embodiments, the vehicle database 428 also includes electronic versions of various manuals associated with the vehicle 100. For example, the vehicle database 428 may include digital versions of an operator manual of the vehicle 100. The operator manual may include descriptions of various components of the vehicle 100. The operator manual may be stored in a format such that it is presentable to the operator via the display 128. The central controller 102 may further include a searching algorithm enabling in the operator to selectively retrieve various portions of the operator manual (e.g., pertaining to specific vehicle subsystems 104-124). Additionally or alternatively, the operator manual may be stored such that it is transmittable via the communications interface 438 to various external computing systems (e.g., the user device 130). This way, other users of the vehicle 100 may interface with the operator manual. The vehicle database 428 may also include various other manuals, such as an operating procedure for pumping, hazardous materials manuals, and the water supply maps discussed above with respect to the location module 426.

Additionally, the vehicle database 428 may also store various forms of information pertaining specifically to the pumping system 114. For example, the vehicle database 428 may include information pertaining to the pressure loss and the friction loss associated with various outlets of the fluid output system 124. Additionally or alternatively, the vehicle database 428 may also store pressure and friction loss charts for the outlets for viewing via the display 128. This way, various personnel may calculate the pressure and friction charts for the respective outlets of the fluid output system 124.

The data may be removed from the vehicle database 428 once the data is uploaded to a remote cloud storage. For example, long-term storage of the telemetry data and other data may be done on a centralized server, and the communications interface 438 may wirelessly connect with a remote server to transmit and store the data. The data includes a timestamp and vehicle identifier information to identify the data in remote server.

In one embodiment, the data is automatically updated periodically. The data may also be updated upon user request. A controller area network (CAN) controller, such as the diagnostics module 424 or another module may be configured to monitor the data and to determine when a potential status of the fire truck has changed based on the telemetry data changes.

The vehicle database 428 may be any type of database (e.g., a SQLite database, etc.), and modules 408-424 may query the database using any type of language or method via backend framework. The backend framework of the central controller 102 may support the activities of periodically updating and querying the vehicle database 428, as well as providing web layer authentication (e.g., to authenticate devices that attempt to access data from vehicle database 428, etc.). The backend framework may further support the various security-related functionality of onboard communications module 408.

The central controller 102 may include, for example, a data transport protocol layer configured to facilitate the query of data from the vehicle database 428 for use by the various modules of the memory 406. In one embodiment, at least one of web sockets and AJAX polling is used to invoke queries via backend framework and provide the data to the frontend applications (e.g., the application layer, the modules, etc.), as they allow changes to the database 428 to be detected and pushed to the application layer. The use of web sockets and/or AJAX may be based on compatibility constraints and performance constraints with the user devices 130 accessing the central controller 102. The application layer, or the frontend application, of the central controller 102 may be built using, for example, HTML5, CSS, and various Javascript libraries.

Figure 5:
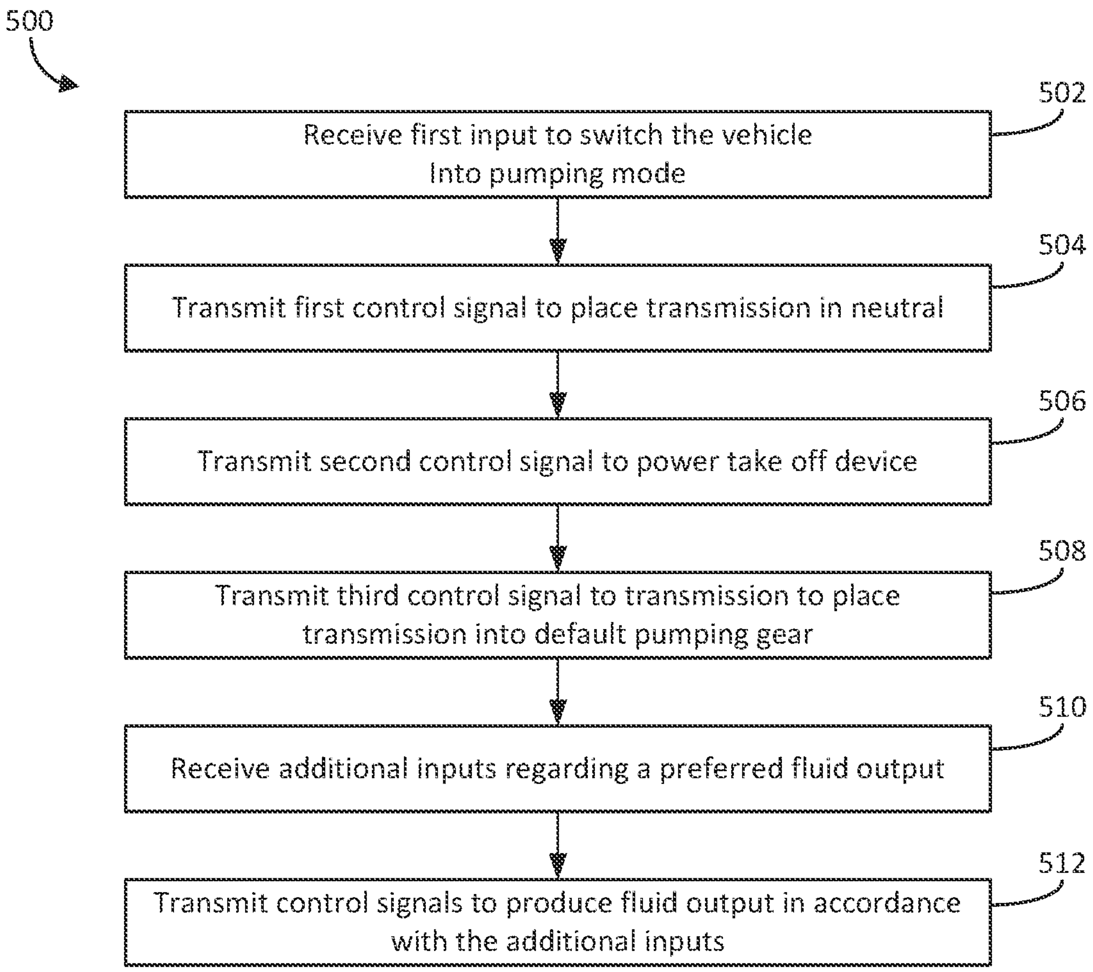
FIG. 5 is a flow diagram of a method for providing a fluid output to an area of interest, according to an exemplary embodiment.

Referring now to FIG. 5, a flow chart of a process 500 for providing a fluid output to an area of interest is shown, according to an exemplary embodiment. Process 500 may be executed by, for example, the transmission control module 410, the power take off control module 412, the engine control module 414, and/or the pump system control module 416 of the central controller 102 discussed above. Process 500 may be executed to provide a desired fluid output to a zone of interest.

Process 500 includes receiving a first input to switch the vehicle 100 into a pumping mode (block 502). For example, the operator may provide various inputs to the central controller 102 to bring the vehicle 100 to the scene of an incident (e.g., a fire). In some embodiments, the operator may stop the vehicle 100 and, via the operator inputs 430, pull a lever so as to indicate a preference to put the vehicle 100 into the pumping mode. In some embodiments, such an input may be provided at the fluid output system 124. For example, a user may pull on an outlet of the fluid output system 124 so as to disengage the output from a holding device to provide an input to place the vehicle 100 into the pumping mode.

Alternatively, the processor 404 may execute the location module 426 and determine that the vehicle 100 is within a predetermined distance of a destination provided by a dispatcher. Upon determining that the vehicle 100 is within the predetermined distance and that the vehicle 100 has stopped moving (or that the parking brake of the vehicle 100 is engaged), the central controller 102 may proceed in the process 500.

Process 500 includes transmitting control signals to the transmission 108 and the PTO 112 to place the vehicle 100 into the pumping mode (blocks 504 and 506). Upon receipt of the input to place the vehicle 100 into pumping mode at block 502, the processor 404 may execute the transmission control module 410 to produce a first control signal disengage various clutches of the transmission 108 so as to place the transmission 108 into neutral. For example, the transmission 108 and the PTO 112 may be arranged such that the transmission 108 must be disengaged from the drive shaft 110 (and thus in neutral) in order to provide any mechanical energy to the pumping system 114. In some embodiments, the central controller 102 may perform various other checks on certain vehicle subsystems prior to placing the transmission 108 into neutral. For example, the central controller may verify that the parking brake of the vehicle 100 is engaged.

Having placed the transmission 108 into neutral, the processor 404 may generate second control signal and transmit that control signal to the PTO 112. The control signal may engage a clutch of the PTO 112 so as to mechanically couple an output shaft of the transmission 108 to a shaft of the PTO 112 coupled to the pumping system 114. Thus, at this point, the vehicle 100 has been placed into pumping mode because the pumping system 114 may receive mechanical energy produced by the engine 106.

Process 500 includes transmitting a third control signal to the transmission 108 to place the transmission 108 into a default pumping gear (block 508). For example, the department with which the vehicle 100 is associated or the manufacturer of a vehicle 100 may set a default gear ratio for the transmission 108 to drive the pumping system 114. In one embodiment, the default gear ratio is 1:1 (e.g., $4^{th}$ gear). Accordingly, a third signal to place the transmission 108 into the default gear ratio may be generated by the processor 404 and transmitted to the transmission 108 by way of the drive system interface 436. Upon this occurring, a throttle control signal may be transmitted to the engine 106 so as to cause the pumping system 114 to create a pressure differential in the intake system 116 to begin drawing fluid from the fluid source 126.

Process 500 includes receiving additional inputs regarding a preferred fluid output (block 510) and providing control signals to various subsystems to produce the preferred output (block 512). Such inputs may be used by the central controller 102 to control the operation of the pumping system 114 by controlling the operational rate of the engine 106. Certain inputs may be received automatically from various sensors within the vehicle 100. For example, a pressure transducer in the pumping system 114 may measure the overall output pressure produced by the pumping system 114 to the fluid output system 124, and the central controller 102 may provide control signals to the engine 106 to maintain this overall output pressure. In another example, the pressure transducer 202 of the fluid intake system 116 may provide such an input. For example, if the pressure transducer 202 provides a signal indicative of a positive pressure from the fluid source 126, the controller 102 may transmit control signals to the engine 106 to reduce the operational rate of the engine 106 (e.g., because less energy is needed from the pumping system 114 to provide the same amount of fluid). In another example, such inputs may be provided by the pressure transducers 304 of the fluid output system 124. In response to a sudden decline in the output pressure (e.g., a decline in output pressure at an outlet line by more than a predetermined amount in less than a predetermined period), for example, the central controller 102 may increase the RPM of the engine 106 to bring the output pressure back to a previous value (e.g., back to a steady state value prior to the sudden decline).

Other inputs regarding a preferred fluid output may be received from the operator of the vehicle 100 or other users. For example, emergency personnel operating the nozzles 308 of the fluid output system 124 may provide various inputs via user inputs 306. The inputs provided may indicate preferred output pressures at the various nozzles 308. In embodiments where the output system 120 includes a plurality of fluidic outputs, the processor 404 may determine a total required water flow to the fluid output system 124 to produce the preferred output pressures (e.g., based on the lengths of the various outlet lines, the nature of the nozzles 308, etc.), and access a lookup table to generate an engine control signal to cause the pumping system 114 to provide a sufficient volume of water to the fluid output system 124. Additionally, the central controller 102 may provide control signals to the output valves 302 associated with the various outputs so as to provide an amount of fluid to each output that corresponds with the desired output pressure at that output.

Additionally or alternatively, a pump operator may provide various inputs as to preferred output pressure at the various outlet lines of the fluid output system 124. Additionally, the operator may indicate such preferences via the display 128, or another user may provide such inputs with a user device 130 via a secure connection with the central controller 102. Thus, the systems and methods disclosed herein allow for flexible control of the pumping system 114 from various vantage points.

Figure 6:
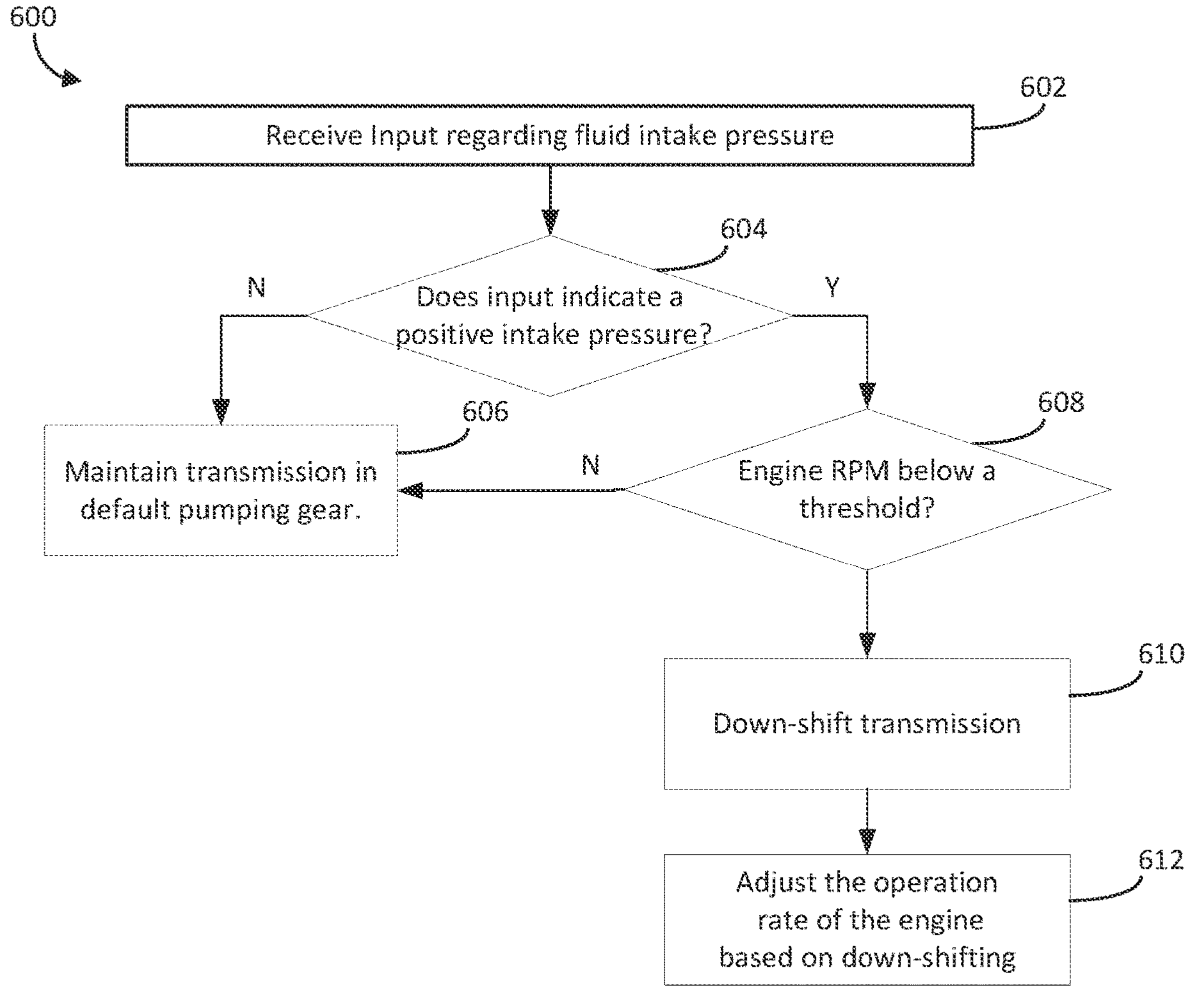
FIG. 6 is a flow diagram of a method for controlling a transmission of a response vehicle based on an intake pressure of a pumping system, according to an exemplary embodiment.

Referring now to FIG. 6, a flow chart of a process 600 for providing pressure control is shown, according to an exemplary embodiment. Process 600 may be executed by, for example, the transmission control module 410, the engine control module 414, and/or the pump system control module 416 of the central controller 102 discussed above. Process 600 may be executed to improve vehicle operation while in the pumping mode.

It should be understood that initiation of the process 600 may take a number of forms. For example, in some embodiments, the process is 600 is initiated automatically once the vehicle 100 is placed into a pumping mode (e.g., by performing blocks 502-508 of the process 500 discussed above). In some embodiments, the process 600 begins upon receipt of the input at step 602 described below.

Process 600 incudes receiving an input regarding a fluid intake pressure (block 602) and determining if the input indicates that the intake pressure is positive (block 604). As discussed above, such an input may be received from an operator or other user, generated by the processor 404 via the location module 426 (e.g., in response to determining that the location of the vehicle 100 is within a predetermined distance of a pre-identified fluid source 126), or received from the fluid intake system 116 (e.g., via pressure transducer 202). Whether the input indicates a positive intake pressure may be determined based on the nature of the input. For example, the operator may indicate the output pressure of a fluid source 126, or the output pressure of a fluid source 126 may be pre-identified by information stored in the vehicle database 428.

If the input does not indicate a positive intake pressure, the transmission 108 is maintained at the default pumping gear discussed above (block 606). In such a case, the central controller 102 may continue to perform processes similar to those discussed above at steps 510 and 512 of the process 500 discussed above. If, however, the input does indicate a positive intake pressure, the central controller 102 determines if the engine RPM is below a predetermined threshold (block 608). If the fluid source 126 provides a positive intake pressure, less energy is required from the pumping system 114 to produce a desired output. Furthermore, less energy to the pumping system 114 may be required to avoid over-pressurizing the various components of the pumping system 114 and/or the fluid intake system 116. Accordingly, in traditional response vehicles, the operator may reduce the engine RPM of the engine 106. This practice may lead to degradations in performance of various other subsystems of the vehicle 100. For example, bringing the engine RPM down may throw the alternator of the vehicle 100 off of an optimal performance curve, leading to deficient powering of various other components (e.g., the air conditioning). Thus, in some embodiments, the predetermined threshold may be determined based on the performance curve of the alternator of the vehicle 100.

To prevent the above-described deficiencies in the event of a positively pressured fluid source 126, process 600 includes down-shifting the transmission 108 to a higher gear ratio in response to a positive intake pressure (block 610). For example, if the default pumping gear of the vehicle 100 is $4^{th}$ gear, the central controller 102 may transmit a control signal to cause the transmission 108 to automatically shift into $3^{rd}$ gear. Thus, the engine 106 is able to operate at a higher RPM without over-pressurizing the pumping system 114. This enables, for example, the alternator of the vehicle 100 to operate more favorably and therefore for better operation of various other vehicle subsystems.

Process 600 includes adjusting the operation rate of the engine 106 based on the downshifting (block 612). For example, the necessary amount of throttling for the engine 106 to produce a given output pressure for the pumping system 114 is now higher given the down-shifting of the transmission 108. As such, to maintain the various output pressures of the pumping system 114 described herein (e.g., at preferred levels indicated by the users at the various nozzles 308), the central controller 102 may access various down-shifted pumping lookup table (e.g., included in the engine control module 414) to generate a control signal for the engine 106 to continue to produce the amount of mechanical energy required to maintain the desired water output.

Figure 7:
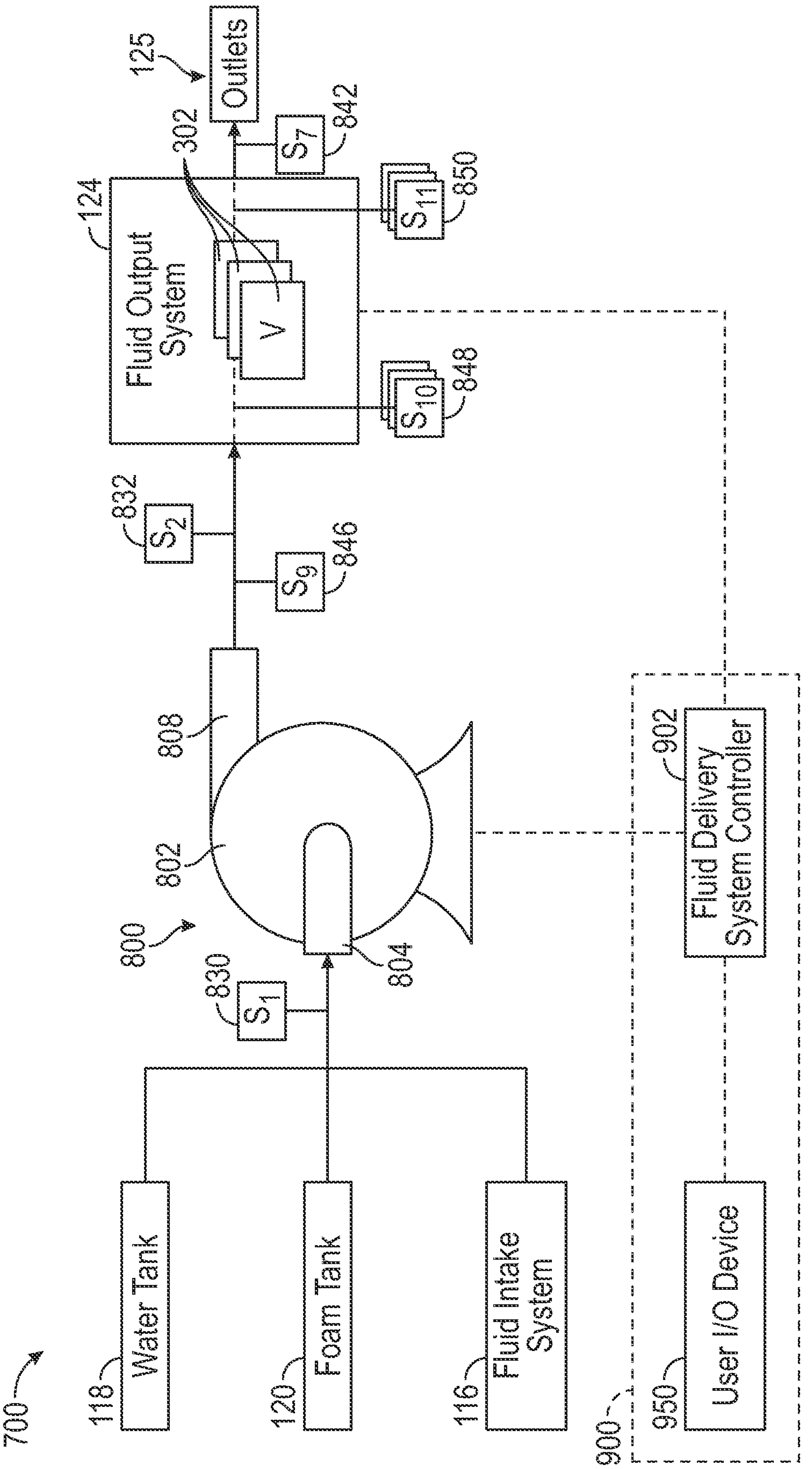
FIG. 7 is a schematic block diagram of a fluid delivery system of the response vehicle of FIG. 1, according to an exemplary embodiment
Figure 8:
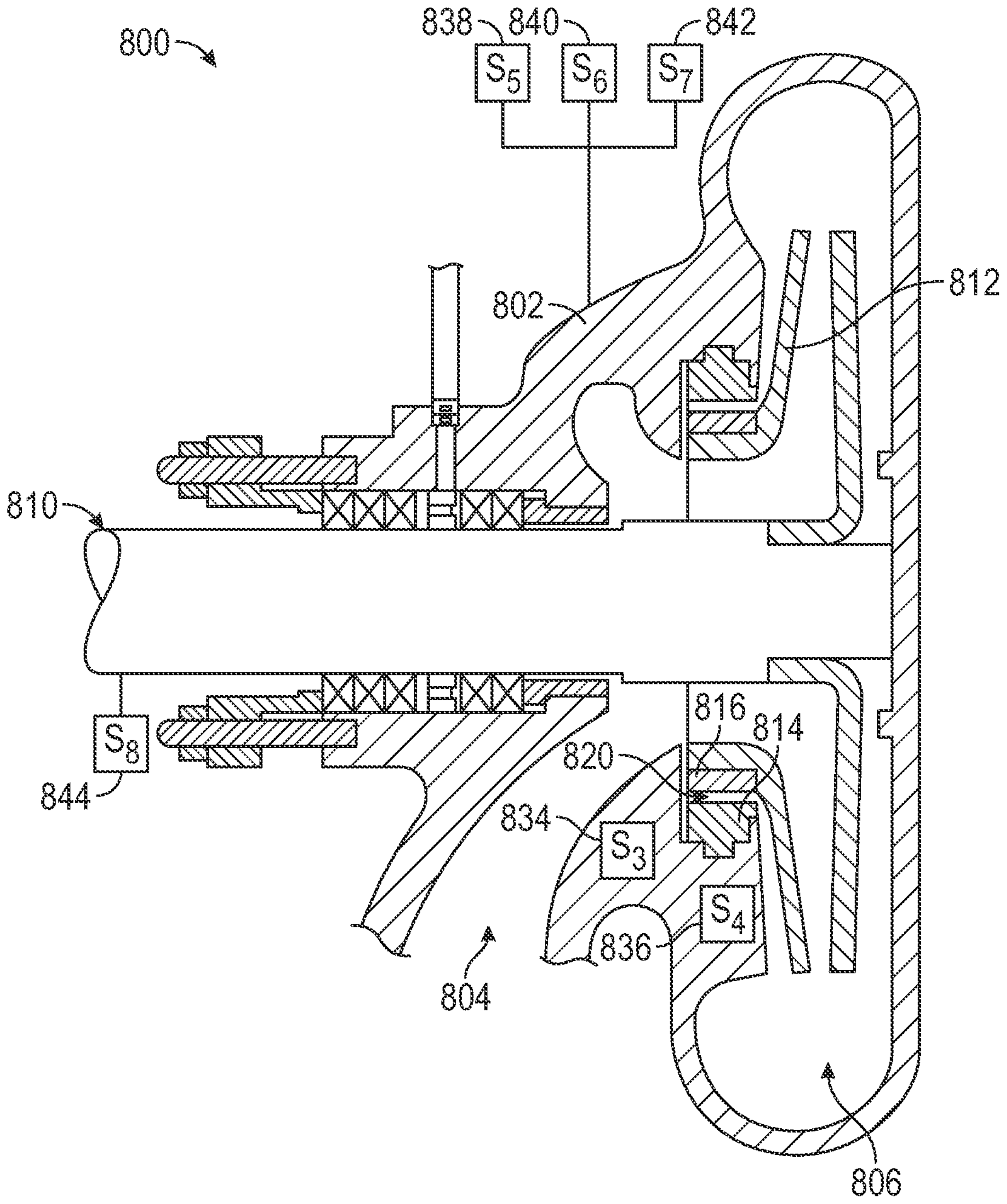
FIG. 8 is a cross-sectional view of a pump of the fluid delivery system of FIG. 7, according to an exemplary embodiment.
Figure 9:
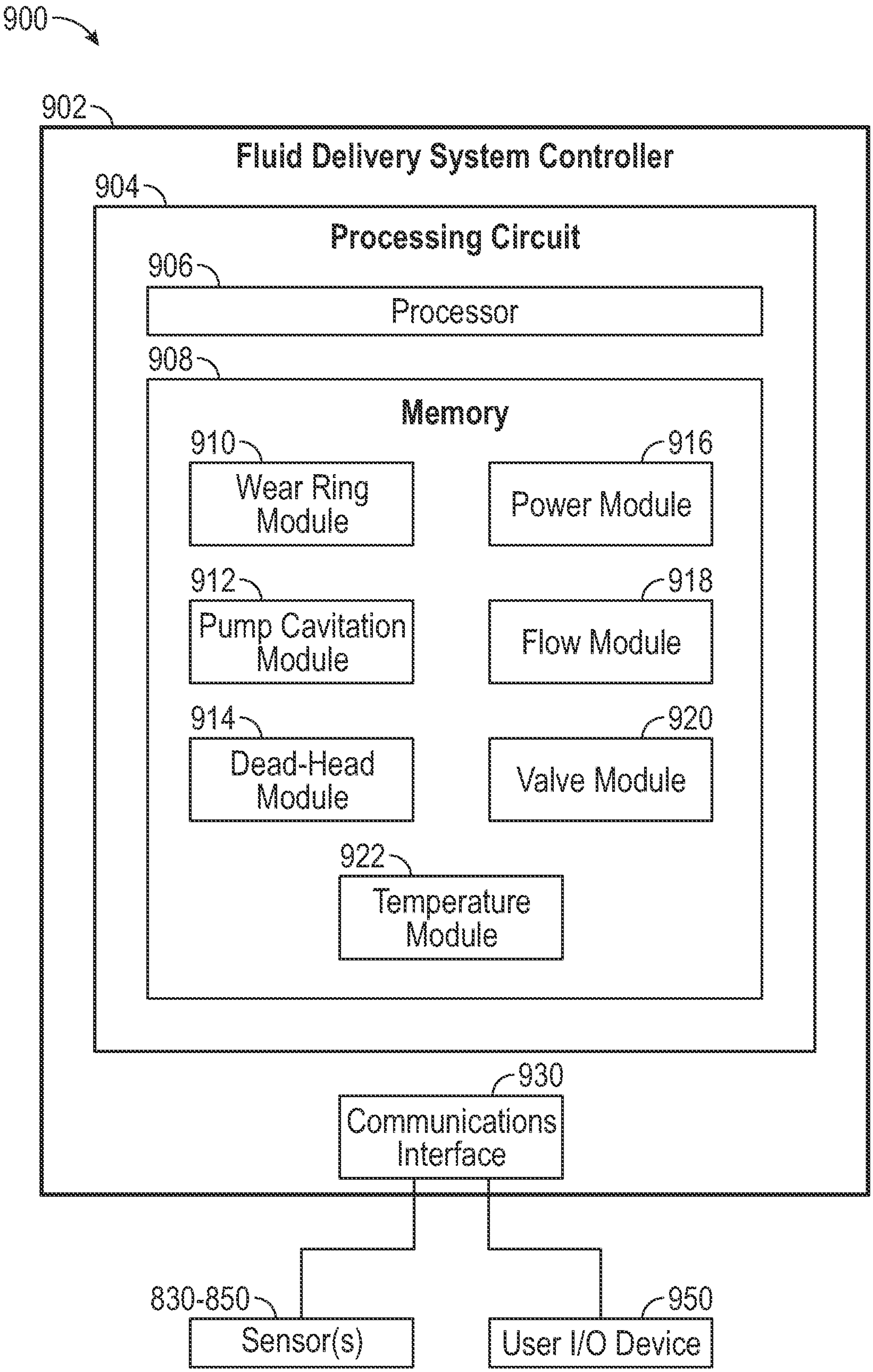
FIG. 9 is a block diagram of a health monitoring system of the fluid delivery system of FIG. 7, according to an exemplary embodiment.

According to the exemplary embodiment shown in FIGS. 7-9, a fluid delivery system (e.g., a water delivery system, a foam delivery system, a water/foam delivery system, etc.), shown as fluid delivery system 700, includes the fluid intake system 116; the water tank 118; the foam tank 120; a fluid driver (e.g., of the pumping system 114, a centrifugal pump, etc.), shown as pump 800; the fluid output system 124; and a monitoring system, shown as health monitoring system 900. In other embodiments, the fluid delivery system 700 does not include one or more of the fluid intake system 116, the water tank 118, and the foam tank 120. As shown in FIGS. 7 and 8, the pump 800 has a body, shown as pump housing 802, including (i) an inlet, shown as fluid inlet 804, fluidly coupled to and configured to receive a fluid (e.g., water, foam, agent, etc.) from the fluid intake system 116, the water tank 118, and/or the foam tank 120 and (ii) an outlet, shown as fluid outlet 808, fluidly coupled to and configured to provide a pressurized fluid to the fluid output system 124. As shown in FIGS. 7 and 9, the health monitoring system 900 includes a control system, shown as fluid delivery system controller 902, a user input/output ("I/O") device, shown as user I/O device 950, and a plurality of sensors, shown as sensors 830-850, variously positioned throughout the fluid delivery system 700.

As shown in FIG. 8, the pump housing 802 defines a chamber, shown as volute 806, positioned between the fluid inlet 804 and the fluid outlet 808. The pump 800 further includes a driving input, shown as input shaft 810, extending through the pump housing 802 and having a compressor element, shown as impeller 812, coupled thereto. According to an exemplary embodiment, the input shaft 810 is driven by a driving element (e.g., a motor, the engine 106, etc.) at a high rotational speed which thereby spins the impeller 812 causing fluid entering the fluid inlet 804 to be pressurized into the volute 806 and exits the pump housing 802 through the fluid outlet 808.

As shown in FIG. 8, the pump 800 includes a first resilient member, shown as pump housing wear ring 814, coupled to the pump housing 802 and a second resilient member, shown as impeller wear ring 816, coupled to the impeller 812. According to an exemplary embodiment, the pump housing wear ring 814 and the impeller wear ring 816 are positioned to align with each other and configured to substantially prevent fluid leakage across the impeller 812 from the volute 806 back to the fluid inlet 804. However, over time, the pump housing wear ring 814 and the impeller wear ring 816 may begin to wear or degrade causing a leakage path, shown as wear ring gap 820, to form therebetween (e.g., such that high pressure fluid flows therethrough back to inlet side of the pump 800, etc.). In some embodiments, the pump 800 includes only one of the pump housing wear ring 814 and the impeller wear ring 816. The health monitoring system 900 may be configured to detect and provide an indication regarding the wear ring gap 820, which is described in more detail herein.

As shown in FIG. 7, the health monitoring system 900 includes a first sensor, shown as inlet pressure sensor 830. According to an exemplary embodiment, the inlet pressure sensor 830 is positioned (e.g., proximate the fluid inlet 804, along an inlet conduit extending between the pump 800 and the fluid source(s), etc.) to acquire pressure data regarding the pressure of the fluid entering the fluid inlet 804 of the pump 800. As shown in FIG. 7, the health monitoring system 900 includes a second sensor, shown as outlet pressure sensor 832. According to an exemplary embodiment, the outlet pressure sensor 832 is positioned (e.g., proximate the fluid outlet 808, along a conduit extending between the pump 800 and the fluid ouptut system 124, etc.) to acquire pressure data regarding the pressure of the fluid exiting the fluid outlet 808 of the pump 800. As shown in FIG. 8, the health monitoring system 900 includes a third sensor, shown as low side pressure sensor 834. According to an exemplary embodiment, the low side pressure sensor 834 is positioned to acquire pressure data regarding the pressure of the fluid on the inlet side of the impeller 812, the pump housing wear ring 814, and the impeller wear ring 816 within the pump housing 802 (e.g., the pressure of the fluid within the fluid inlet 804, etc.). As shown in FIG. 8, the health monitoring system 900 includes a fourth sensor, shown as high side pressure sensor 836. According to an exemplary embodiment, the high side pressure sensor 836 is positioned to acquire pressure data regarding the pressure of the fluid on the outlet side of the impeller 812, the pump housing wear ring 814, and the impeller wear ring 816 within the pump housing 802 (e.g., the pressure of the fluid within the volute 806, etc.). According to an exemplary embodiment, (i) the inlet pressure sensor 830 and the outlet pressure sensor 832 facilitate monitoring the pressure differential across the pump 800 and (ii) the low side pressure sensor 834 and the high side pressure sensor 836 facilitate monitoring the pressure differential across the impeller 812, the pump housing wear ring 814, and the impeller wear ring 816. In some embodiments, the health monitoring system 900 does not include the inlet pressure sensor 830, the outlet pressure sensor 832, the low side pressure sensor 834, and/or the high side pressure sensor 836.

As shown in FIG. 8, the health monitoring system 900 includes a fifth sensor, shown as ultrasonic sensor 838. According to an exemplary embodiment, the ultrasonic sensor 838 is positioned to transmit sound waves at the pump housing wear ring 814 and the impeller wear ring 816 to acquire ultrasound data to facilitate detecting the formation of the wear ring gap 820 and monitoring the size thereof. In some embodiments, the health monitoring system 900 does not include the ultrasonic sensor 838.

As shown in FIG. 8, the health monitoring system 900 includes a sixth sensor, shown as cavitation sensor 840. According to an exemplary embodiment, the cavitation sensor 840 is positioned to acquire cavitation data to facilitate detecting cavitation events within the pump 800. The cavitation sensor 840 may be or include a knock sensor, an acoustic sensor, and/or still another suitable sensor capable of detecting cavitation events. In some embodiments, the health monitoring system 900 does not include the cavitation sensor 840.

As shown in FIGS. 7 and 8, the health monitoring system 900 includes one or more seventh sensors, shown as temperature sensors 842. According to an exemplary embodiment, at least one of the temperature sensors 842 is positioned to acquire temperature data regarding the temperature of the pump housing 840. In some embodiments, the temperature sensors 842 are otherwise positioned about the fluid delivery system 700 and/or the health monitoring system 900 includes additional temperature sensors 842 otherwise positioned about the fluid delivery system 700 to acquire temperature data regarding the temperature of other components within the fluid delivery system 700 (e.g., positioned at the fluid outlet 808, positioned along the conduit connecting the fluid outlet 808 and the fluid output system 124, positioned proximate outlets 125 of the fluid output system 124, etc.) and/or the temperature of the fluid being provided by the pump 800 to the fluid output system 124. In some embodiments, the health monitoring system 900 does not include the temperature sensors 842.

As shown in FIG. 8, the health monitoring system 900 includes an eighth sensor, shown as speed sensor 844. According to an exemplary embodiment, the speed sensor 844 is positioned to acquire speed data regarding the rotational speed of the input shaft 810, and thereby the rotational speed of the impeller 812. In some embodiments, the health monitoring system 900 does not include the speed sensor 844.

As shown in FIG. 7, the health monitoring system 900 includes a ninth sensor, shown as flow sensor 846. According to an exemplary embodiment, the flow sensor 846 is positioned (e.g., proximate the fluid outlet 808, along an outlet conduit extending between the pump 800 and the fluid output system 124, etc.) to acquire flow data regarding the flow rate of the fluid exiting the fluid outlet 808 of the pump 800. The flow sensor 846 may be an integrated flow sensor, a portable flow meter, and/or still another type of sensor. In some embodiments, the health monitoring system 900 does not include the flow sensor 846.

As shown in FIG. 7, the health monitoring system 900 includes a plurality of tenth sensors, shown as inlet pressure sensors 848. According to an exemplary embodiment, each of the inlet pressure sensors 848 is positioned (e.g., proximate the fluid inlet of a respective output valve 302, etc.) to acquire pressure data regarding the pressure of the fluid entering a respective output valve 302 of the fluid output system 124. As shown in FIG. 7, the health monitoring system 900 includes a plurality of eleventh sensors, shown as outlet pressure sensors 850. According to an exemplary embodiment, each of the outlet pressure sensors 850 is positioned (e.g., proximate the fluid outlet of a respective output valve 302, etc.) to acquire pressure data regarding the pressure of the fluid exiting a respective output valve 302 of the fluid output system 124. According to an exemplary embodiment, (i) the inlet pressure sensors 848 and the outlet pressure sensors 850 facilitate monitoring the pressure differential across each of the output valves 302 of the fluid output system 124.

As shown in FIG. 9, the fluid delivery system controller 902 includes a processing circuit 904 including a processor 906 and a memory 908. The processor 906 may be a general purpose or specific purpose processor, an application specific integrated circuit (ASIC), one or more field programmable gate arrays (FPGAs), a group of processing components, or other suitable processing components. The processor 906 may be configured to execute computer code or instructions stored in the memory 908 or received from other computer readable media (e.g., CDROM, network storage, a remote server, etc.) to perform one or more of the processes described herein. The memory 908 may include one or more data storage devices (e.g., memory units, memory devices, computer-readable storage media, etc.) configured to store data, computer code, executable instructions, or other forms of computer-readable information. The memory 908 may include random access memory (RAM), read-only memory (ROM), hard drive storage, temporary storage, non-volatile memory, flash memory, optical memory, or any other suitable memory for storing software objects and/or computer instructions. The memory 908 may include database components, object code components, script components, or any other type of information structure for supporting the various activities and information structures described in the present disclosure. The memory 908 may be communicably connected to the processor 906 via the processing circuit 904 and may include computer code for executing (e.g., by the processor 906, etc.) one or more of the processes described herein.

The memory 908 is described below as including various modules. While the exemplary embodiment shown in the figures shows each of the modules 910-922 as being separate from one another, it should be understood that, in various other embodiments, the memory may include more, less, or altogether different modules. For example, the structures and functions of one module may be performed by another module, or the activities of two modules may be combined such that they are performed by only a signal module. Additionally, it should be understood that any of the functionalities described as being performed by a module that is a part of the fluid delivery system controller 902 below may also be performed by a separate hardware component having its own processors, network interfaces, etc. In some embodiments, one or more of the functions described herein performed by the fluid delivery system controller 902 are performed by the central controller 102.

As shown in FIG. 4, the fluid delivery system controller 902 includes a communications interface 930 configured to facilitate wired and/or wireless communications with the sensors 830-850 and the user I/O device 950. In some embodiments, the communications interface 930 is configured to facilitate communication with the central controller 102 and/or other components of the vehicle 100 (e.g., the engine 106, etc.).

According to an exemplary embodiment, the wear ring module 910 is configured to detect the formation of the wear ring gap 820 between the pump housing wear ring 814 and the impeller wear ring 816 and monitor the size of the wear ring gap 820, the effect the wear ring gap 820 has on performance, etc. In one embodiment, the wear ring module 910 is configured to receive and interpret the pressure data acquired by the inlet pressure sensor 830, the outlet pressure sensor 832, the low side pressure sensor 834, and/or the high side pressure sensor 836 to detect the wear ring gap 820. By way of example, the wear ring module 910 may compare (i) the pressure differential across the wear ring (i.e., the pump housing wear ring 814 and the impeller wear ring 816) determined based on the pressure data received from the low side pressure sensor 834 and the high side pressure sensor 836 to (ii) the pressure differential across the pump 800 determined based on pressure data received from the inlet pressure sensor 830 and the outlet pressure sensor 832. The wear ring module 910 may be configured to provide a notification on the user I/O device 950 regarding wear ring degradation in response to the pressure differential across the wear ring and the pressure differential across the pump 800 deviating by less than a threshold amount (e.g., the pressure differential comparison between the two becoming smaller, etc.).

By way of another example, the wear ring module 910 may be configured to pre-store or receive a wear ring pressure differential threshold. The wear ring module 910 may be configured to compare the pressure differential across the wear ring (i.e., the pump housing wear ring 814 and the impeller wear ring 816) determined based on the pressure data received from the low side pressure sensor 834 and the high side pressure sensor 836 to the wear ring pressure differential threshold. The wear ring module 910 may be configured to provide a notification on the user I/O device 950 regarding wear ring degradation in response to the pressure differential across the wear ring falling below the wear ring pressure differential threshold.

In another embodiment, the wear ring module 910 is configured to receive and interpret the ultrasound data acquired by the ultrasonic sensor 838 to detect the formation of the wear ring gap 820 and monitor the size thereof. The wear ring module 910 may be configured to provide a notification on the user I/O device 950 regarding wear ring degradation in response to the size of the wear ring gap 820 exceeding a threshold amount.

According to an exemplary embodiment, the pump cavitation module 912 is configured to detect cavitation events within the pump 800. The pump cavitation module 912 may be configured to receive the cavitation data from the cavitation sensor 840 to detect the cavitation events. Cavitation may typically occur within the pump 800 when the pump 800 is operating at the limits thereof (e.g., exceeding rated flow rate, exceeding rated pressure, driving the impeller 812 at a rotational speed too fast for the inlet conditions (the inlet fluid pressure and flow rate) and/or the pump design, etc.). The operating conditions for the cavitation events that occur when operating at the limits of the pump 800 may be stored in the pump cavitation module 912 (e.g., as threshold values, etc.). The pump cavitation module 912 may be configured to monitor the operating conditions of the pump 800 (e.g., outlet pressure via the outlet pressure sensor 832, outlet flow rate via the flow sensor 846, pump speed via the speed sensor 844, etc.) when a cavitation event occurs. Pump degradation or damage may be present if cavitation events begin to occur at operating conditions that are lower than the limits or predetermined thresholds of the pump 800. The pump cavitation module 912 may therefore be configured to provide a notification on the user I/O device 950 regarding pump degradation or damage in response to cavitation events occurring more frequently and/or at lower or different operating points (e.g., below a speed threshold, a pressure threshold, a flow rate threshold, etc.) than is typical (e.g., when the pump is new, etc.).

According to an exemplary embodiment, the dead-head module 914 is configured to determine health of the pump 800 based on operating characteristics (e.g., pressure, etc.) that occur when dead-heading the pump 800 while operating the pump 800 at specified operating characteristics (e.g., specified flow, pressure, speed, etc.) relative to pre-stored thresholds. The pre-stored thresholds may be determined based on operation of the pump 800 when brand new and/or after passing a credible performance test such as an NFPA performance test (e.g., determined using a baseline dead-head test, etc.). Dead-heading the pump 800 may include closing the outlet of the pump 800 abruptly during operation which causes the outlet pressure to rise. If the pressure rises as much as it did when the pump 800 was new and/or after passing the credible performance test, then the pump is still healthy. Eventually, however, the pump 800 will wear and the pressure will spike (after dead-heading the pump 800 while operating at the pump 800 at the specified operating characteristics) less than it did when new and/or after passing the credible performance test. The dead-head module 914 may be configured to provide a "healthy" indication or a warning indication on the user I/O device 950 based on the pressure change when dead-heading the pump 800 relative to the pre-stored thresholds.

Figure 10:
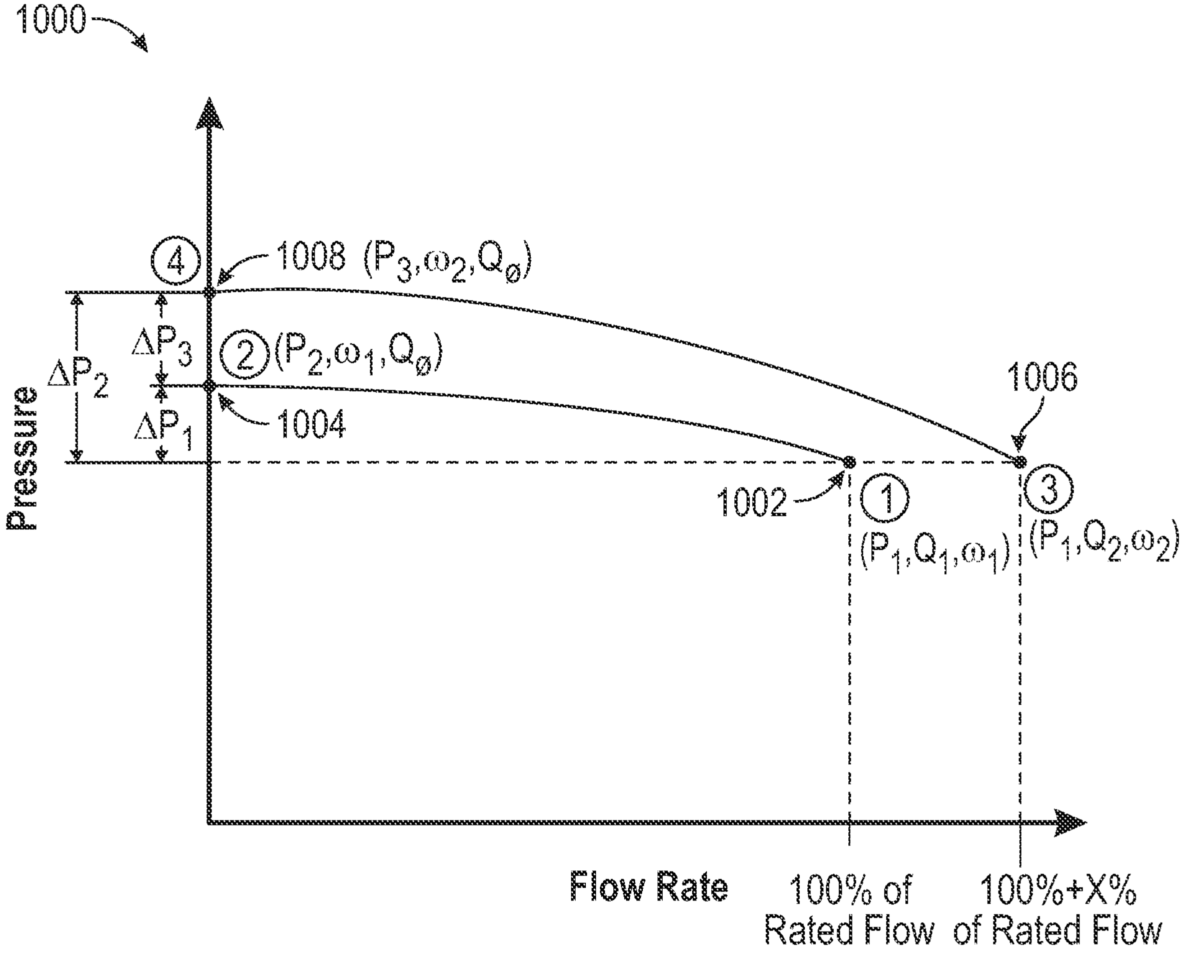
FIG. 10 is a graph of an initial dead-head test, according to an exemplary embodiment.

By way of example, the dead-head module 914 may be configured to facilitate implementing a baseline dead-head test while the pump 800 is new and/or after passing the credible performance test to determine a dead-head pressure threshold (for one or more operating states or points). Referring to FIG. 10, a graph 1000 depicting the baseline dead-head test conducted on the pump 800 is shown, according to an exemplary embodiment. At 1002, the dead-head module 914 is configured to operate the pump 800 at first operating conditions including a predetermined output pressure (e.g., 100% of the rated pressure of the pump 800, an industry standard pressure setpoint, 150 psi, etc.), $P_1$, and a predetermined output flow rate (e.g., 100% of the rated flow rate of the pump 800, an industry standard flow rate setpoint, 2000 gpm, etc.), $Q_1$ (point 1). The dead-head module 914 is then configured to record the pump speed, $\omega_1$, required to achieve the predetermined output pressure and the predetermined output flow rate. The pump speed may be received from the speed sensor 844 and/or determined based on engine speed. At 1004, the dead-head module 914 is configured to dead-head the pump 800 while the system is initially operating at the first operating conditions such that the flow decreases to zero or near zero while the speed, $\omega_1$, is maintained. The dead-head module 914 then records the dead-head pressure, $P_2$ (point 2). The dead-head module 914 may be configured to determine a pressure rise, $\Delta P_1$ (i.e., the pressure change from point 1 to point 2), based on $P_1$ and $P_2$.

At 1006, the dead-head module 914 is configured to operate the pump 800 at second operating conditions including the predetermined output pressure, $P_1$, and a maximum output flow rate (e.g., 100%+X % of the rated flow rate of the pump 800, 110% of the rated flow rate of the pump 800, 120% of the rated flow rate of the pump 800, etc.), $Q_2$, of the pump 800 (point 3). The dead-head module 914 is then configured to record the pump speed, ω2, required to achieve the predetermined output pressure and the maximum output flow rate. At 1008, the dead-head module 914 is configured to dead-head the pump 800 while the system is initially operating at the second operating conditions such that the flow decreases to zero or near zero while the speed, $\omega_2$, is maintained. The dead-head module 914 then records the dead-head pressure, $P_3$ (point 4). The dead-head module 914 may be configured to determine a pressure rise, $\Delta P_2$ (i.e., the pressure change from point 3 to point 4), based on $P_1$ and $P_3$.

The dead-head module 914 may be configured to determine a pressure difference, $\Delta P_3$, between the first pressure rise, $\Delta P_1$, and the pressure rise, $\Delta P_2$. The pressure difference, $\Delta P_3$, may represent a reserve pressure or allowable pressure decay in pump performance over time before the pump 800 would no longer be capable of meeting the required performance at the selected test point. This process may be repeated for various different pre-selected test points (e.g., industry standard test points, pressure and flow rate combinations, etc.) to be used in identifying pump health.

The dead-head module 914 may be configured to use the reserve pressure or allowable pressure decay ($\Delta P_3$) to identify pump health at some future point in time (e.g., annually, semi-annually, after using the pump for a number of hours, etc.). By way of example, the dead-head module 914 may implement a dead-head health test to determine the health of the pump. The dead-head health test may be performed by the dead-head module 914 (i) in response to receiving an input from an operator through the user I/O device 950 to run the dead-head health test or (ii) at some predetermined interval (e.g., annually, semi-annually, based on a number of hours of operation, each time the pump is turned on or engaged, etc.).

The dead-head module 914 may be configured to implement the dead-head health test by operating the pump 800 at the predetermined output flow rate, $Q_1$, and the pump speed, $\omega_1$, determined from the baseline dead-head test (e.g., at 1002). The dead-head module 914 may then dead-head the pump 800. The dead-head module 914 may be configured to record the dead-head pressure following the pressure rise in response to dead-heading the pump 800. The dead-head module 914 may then be configured to compare the dead-head pressure to the pressure $P_2$ to determine a pressure difference. The dead-head module 914 may be configured to provide a "healthy" indication on the user I/O device 950 in response to the pressure difference between $P_2$ and the dead-head pressure being less than the reserve pressure $\Delta P_3$ (i.e., determined from baseline dead-head test). The difference between $P_2$ and the dead-head pressure being less than the reserve pressure $\Delta P_3$ indicates that the pump 800 still has enough reserve pressure to meet the rated output conditions of the pump 800. The dead-head module 914 may be configured to provide a warning on the user I/O device 950 in response to the pressure difference between $P_2$ and the dead-head pressure being greater than the reserve pressure $\Delta P_3$. The dead-head module 914 may perform the dead-head health test for the various different pre-selected test points.

According to an exemplary embodiment, the power module 916 is configured to pre-store information regarding the amount of power used to operate the pump 800 at certain set point conditions. The power module 916 may use such information to determine pump performance. The power module 916 may be configured to receive information from the engine 106 or the central controller 102 regarding the current power output of the engine 106 being provided to drive the pump 800. The power module 916 may compare the current power output used to drive the pump 800 to the pre-stored information at the same or a similar set point condition to determine pump performance. By way of example, over time, the performance of the pump 800 may begin to degrade. Therefore, as the pump 800 degrades, the engine 106 may have to provide a greater power output to the pump 800 to provide the same set point conditions. For example, the pump 800 may provide X amount of flow at Y pressure when operated at Z speed. To achieve this may require a certain amount of power from the engine 106. Over time, the amount of power needed from the engine 106 to achieve such conditions may increase. Therefore, as the amount of power from the engine 106 increases to provide the set point conditions of the pump 800, the pump health decreases. If the amount of power required increases sufficiently (e.g., by more than a threshold, etc.) to provide the set point conditions, the power module 916 may be configured to provide a notification on the user I/O device 950 regarding pump degradation or damage (e.g., such that the operator can perform maintenance, replace the pump 800, etc.).

According to an exemplary embodiment, the flow module 918 is configured to pre-store information regarding the amount of flow provided by the pump 800 at certain set point conditions. The flow module 918 may use such information to determine pump performance. The flow module 918 may be configured to receive information from the flow sensor 846 regarding the current output flow provided by the pump 800 at the current set point or operating conditions (e.g., engine power, pump speed, etc.). The flow module 918 may compare the current output flow provided by the pump 800 to the pre-stored information at the same or a similar set point condition to determine pump performance. By way of example, over time, the performance of the pump 800 may begin to degrade. Therefore, the pump 800 may provide a lesser output flow at the same set point conditions as the pump 800 degrades. For example, the pump 800 may provide X amount of flow at Y pressure when operated at Z speed. Over time, the amount of flow provided by the pump 800 may decrease when operated at the same speed. Therefore, as the amount of flow provided by the pump 800 decreases (at a respective set point), so does the pump health. If the amount of flow decreases sufficiently (e.g., by more than a threshold, etc.) when the pump 800 is operated at the set point conditions, the flow module 918 may be configured to provide a notification on the user I/O device 950 regarding pump degradation or damage (e.g., such that the operator can perform maintenance, replace the pump 800, etc.). Traditionally, such flow measurements are incapable of being performed proximate the outlet of the pump 800, but rather requires a long tube that facilitates measuring laminar flow. According to an exemplary embodiment, the flow sensor 846 is capable of monitoring flow without such long tubing.

According to an exemplary embodiment, the valve module 920 is configured to determine the health of the output valves 302 of the fluid output system 124. By way of example, the valve module 920 may be configured to receive pressure data from the inlet pressure sensor 848 and the outlet pressure sensor 850 of a respective output valve 302. The valve module 920 may be configured to determine a pressure differential across the respective output valve 302 based on the inlet and outlet pressures of the respective output valve 302. The valve module 920 may be configured to interpret the pressure differential across the respective output valve 302 to determine if there is any leaking. In some embodiments, the valve module 920 is configured to compare the pressure differential across the respective output valve 302 (e.g., when the respective output valve 302 is closed, etc.) to the pressure of the system to determine if there is leaking (e.g., if the pressure differential is less than the system pressure, etc.). The valve module 920 may be configured to provide a notification on the user I/O device 950 regarding valve degradation if the valve module 920 detects leaking (e.g., such that the operator can perform maintenance, replace the output valve(s) 302, etc.).

By way of another example, the valve module 920 may be additionally or alternatively configured to determine the health of the output valves 302 by stroking the valves under a loaded condition. The force required to activate (e.g., rotate, etc.) the output valves 302 under a series of pressures could be recorded by the valve module 920 and compared to pre-stored baselines. As the force required to activate the output valves increases towards a threshold level, the valve module 920 may be configured to provide a notification on the user I/O device 950 regarding valve degradation (e.g., such that the operator can perform maintenance, replace the output valve(s) 302, etc.).

According to an exemplary embodiment, the temperature module 922 is configured to receive temperature data from the temperature sensors 842. By way of example, when the pump 800 is operated at high setpoints, it may create substantial amounts of heat. The increase in the temperature of the pump 800 (e.g., the pump housing 802, etc.) can cause early cavitation and/or damage components of the pump 800. The temperature module 922 may therefore be configured to provide a notification on the user I/O device 950 regarding the temperature of the pump 800 such that an operator can introduce cool water to the system and/or slow the pump 800 down. Alternatively, the temperature module 922 may be configured to automatically activate cooling methods and/or limit operation of the pump 800 in response to the temperature exceeding a temperature threshold.

The temperature module 922 may additionally or alternatively be configured to provide a warning on the user I/O device 950 regarding the temperature of the water at outlets 125 of the fluid output system 124 and/or a temperature of caps on the outlets 125 of the fluid output system 124. By way of example, during cold months of the year a pump heater may be used to maintain the pump 800 at a desired temperature when not in use (e.g., to prevent freezing, etc.). If the pump heater remains active during pumping operations and/or the ambient temperature is sufficiently high, the fluid (e.g., water, etc.) exiting the pump 800 may be provided to the outlets 125 at a high temperature. The temperature module 922 may be configured to provide a warning to the pump operator (e.g., proximate the outlets 125, via the user I/O device 950, via an indicator light, etc.) that the fluid temperature is elevated and to proceed with caution. In some embodiments, the temperature module 922 is configured to facilitate initiating (e.g., automatically, in response to an operator input, etc.) a cooling mode that cools the outlets 125 and/or the fluid to a lower temperature.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A fluid supply system for a fire apparatus, the fluid supply system comprising:
- a fluid delivery system including a pump;
- a sensor configured to acquire data regarding the fluid delivery system; and
- a processing circuit coupled to the sensor, the processing circuit configured to perform a dead-head health test to determine a health level of the pump based on the data, wherein, to perform the dead-head health test, the processing circuit is configured to:
  - operate the pump at a predetermined output flow rate and a predetermined speed;
  - dead-head the pump such that the predetermined output flow rate decreases to at least a threshold level while maintaining the predetermined speed;
  - determine a dead-head pressure in response to dead-heading the pump;
  - determine a pressure difference between the dead-head pressure and a predetermined dead-head pressure;
  - compare the pressure difference to a predetermined pressure difference; and
  - provide a notification in response to the pressure difference being greater than the predetermined pressure difference.

2. The fluid supply system of claim 1, wherein the pump includes:
- a housing defining an interior chamber, an inlet configured to receive a fluid from a fluid source, and an outlet configured to a provide pressurized fluid to a fluid output system;
- an impeller disposed within the interior chamber; and
- an input coupled to the impeller, the input configured to facilitate driving the impeller to pressurize the fluid received at the inlet to generate the pressurized fluid within the interior chamber.

3. The fluid supply system of claim 2, wherein:
- the sensor includes:
  - a first pressure sensor positioned to acquire pressure data regarding a first pressure of the fluid on an inlet side of the impeller, within the housing; and
  - a second pressure sensor positioned to acquire pressure data regarding a second pressure of the pressurized fluid on an outlet side of the impeller, within the housing; and
- the processing circuit is configured to:
  - determine a pressure differential between the second pressure and the first pressure; and
  - provide a pressure differential notification in response to the pressure differential being less than a pressure differential threshold.

4. The fluid supply system of claim 1, wherein:
- the sensor includes a cavitation sensor positioned to acquire cavitation data regarding cavitation events within the pump; and
- the processing circuit is configured to:
  - detect the cavitation events based on the cavitation data; and
  - provide a cavitation notification in response to at least one of (i) the cavitation events occurring at atypical operating conditions of the pump or (ii) the cavitation events occurring more frequently.

5. The fluid supply system of claim 1, wherein the processing circuit is configured to perform a dead-head baseline test on the pump to determine and store the predetermined speed, the predetermined dead-head pressure, and the predetermined pressure difference.

6. The fluid supply system of claim 5, wherein, to perform the dead-head baseline test, the processing circuit is configured to:
- operate the pump at a predetermined output pressure and the predetermined output flow rate;
- determine a first speed required to achieve the predetermined output pressure and the predetermined output flow rate, wherein the first speed is the predetermined speed;
- dead-head the pump a first time such that the predetermined output flow rate decreases to at least the threshold level while maintaining the first speed;
- determine a first dead-head pressure in response to dead-heading the pump the first time, wherein the first dead-head pressure is the predetermined dead-head pressure;
- operate the pump at the predetermined output pressure and a maximum output flow rate;

determine a second speed required to achieve the predetermined output pressure and the maximum output flow rate;

dead-head the pump a second time such that the maximum output flow rate decreases to at least the threshold level while maintaining the second speed;

determine a second dead-head pressure in response to dead-heading the pump the second time; and determine a baseline pressure difference between the second dead-head pressure and the first dead-head pressure, wherein the baseline pressure difference is the predetermined pressure difference.

7. The fluid supply system of claim 1, wherein the processing circuit is configured to:

receive power information regarding a power input provided to an input of the pump;

determine operating characteristics of the pump based on the power input;

compare the operating characteristics to predetermined operating characteristics at the power input; and provide a power input notification in response to the operating characteristics deviating from the predetermined operating characteristics by more than a threshold amount.

8. The fluid supply system of claim 1, wherein:

the sensor includes a flow sensor positioned proximate an outlet of the pump, the flow sensor configured to acquire flow data regarding an output flow from the pump; and the processing circuit is configured to:

determine operating characteristics of the pump providing the output flow;

compare the operating characteristics to predetermined operating characteristics at the output flow; and provide a flow notification in response to the operating characteristics deviating from the predetermined operating characteristics by more than a threshold amount.

9. The fluid supply system of claim 1, wherein the fluid delivery system includes a fluid output system, the fluid output system including a fluid outlet and a valve positioned to selectively restrict flow to the fluid outlet, and wherein:

the sensor includes:

a first pressure sensor positioned to acquire first pressure data regarding a first pressure of a pressurized fluid provided by the pump and entering the valve; and a second pressure sensor positioned to acquire second pressure data regarding a second pressure of the pressurized fluid exiting the valve; and the processing circuit is configured to:

determine a pressure differential across the valve based on the first pressure and the second pressure; and provide a pressure differential notification in response to the pressure differential being less than a pressure threshold.

10. The fluid supply system of claim 1, wherein the fluid delivery system includes a fluid output system including one or more outlets, further comprising a temperature sensor positioned to acquire temperature data regarding a temperature of at least one of (i) a pressurized fluid provided to the one or more outlets by the pump or (ii) the one or more outlets, and wherein the processing circuit is configured to at least one of (i) provide a warning or (ii) initiate a cooling mode to cool at least one of the pressurized fluid or the one or more outlets in response to the temperature exceeding a temperature threshold.

11. The fluid supply system of claim 1, further comprising a temperature sensor positioned to acquire temperature data regarding a temperature of at least one of the pump or a pressurized fluid provided by the pump, wherein the processing circuit is configured to at least one of (i) provide a warning, (ii) introduce cool fluid into the fluid delivery system, or (iii) slow down the pump in response to the temperature exceeding a temperature threshold.

12. A fluid supply system for a fire apparatus, the fluid supply system comprising:

a fluid delivery system including a pump, the pump including:

a housing defining an interior chamber, an inlet configured to receive a fluid from a fluid source, and an outlet configured to a provide pressurized fluid to a fluid output system;

an impeller disposed within the interior chamber; and an input coupled to the impeller, the input configured to facilitate driving the impeller to pressurize the fluid received at the inlet to generate the pressurized fluid within the interior chamber;

a first pressure sensor positioned to acquire pressure data regarding a first pressure of the fluid on an inlet side of the impeller, within the housing;

a second pressure sensor positioned to acquire pressure data regarding a second pressure of the pressurized fluid on an outlet side of the impeller, within the housing;

a third pressure sensor positioned to acquire pressure data regarding a third pressure of the fluid at the inlet of the housing;

a fourth pressure sensor positioned to acquire pressure data regarding a fourth pressure of the pressurized fluid at the outlet of the housing; and a processing circuit configured to:

determine a first pressure differential across the impeller based on the first pressure and the second pressure;

determine a second pressure differential across the pump based on the third pressure and the fourth pressure; and provide a notification in response to the first pressure differential and the second pressure differential deviating by less than a threshold amount.

13. A fluid supply system for a fire apparatus, the fluid supply system comprising:

a fluid delivery system including a pump, the pump including:

a housing defining an interior chamber, an inlet configured to receive a fluid from a fluid source, and an outlet configured to a provide pressurized fluid to a fluid output system;

an impeller disposed within the interior chamber; and an input coupled to the impeller, the input configured to facilitate driving the impeller to pressurize the fluid received at the inlet to generate the pressurized fluid within the interior chamber, a sensor configured to acquire data regarding the fluid delivery system, wherein the sensor includes an ultrasonic sensor positioned to transmit sound waves toward components of the pump to acquire ultrasound data; and a processing circuit coupled to the sensor, wherein the processing circuit is configured to:

detect a leakage path between the components based on the ultrasound data acquired with the ultrasonic sensor; and provide a notification in response to a size of the leakage path exceeding a threshold size.

14. The fluid supply system of claim 13, wherein the pump includes at least one of (i) a first resilient element coupled to the housing or (ii) a second resilient element coupled to the impeller, the at least one of the first resilient element or the second resilient element positioned to prevent fluid leakage across the impeller from the interior chamber back to the inlet.

15. A fluid supply system for a fire apparatus, the fluid supply system comprising:

a fluid delivery system including a pump and a fluid output system, the fluid output system including a fluid outlet and a valve positioned to selectively restrict flow to the fluid outlet;

a sensor configured to acquire data regarding the fluid delivery system; and a processing circuit coupled to the sensor, the processing circuit configured to:

stroke the valve under a loaded condition; and provide a notification in response to a force required to stroke the valve exceeding a force threshold.

16. A fluid supply system for a fire apparatus, the fluid supply system comprising:

a pump; and a processing circuit configured to perform a dead-head health test to determine a health level of the pump, wherein, to perform the dead-head health test, the processing circuit is configured to:

operate the pump at a predetermined output flow rate and a predetermined speed;

dead-head the pump such that the predetermined output flow rate decreases to at least a threshold level while maintaining the predetermined speed;

determine a dead-head pressure in response to dead-heading the pump;

determine a pressure difference between the dead-head pressure and a predetermined dead-head pressure;

compare the pressure difference to a predetermined pressure difference; and provide a notification in response to the pressure difference being greater than the predetermined pressure difference.

17. The fluid supply system of claim 16, wherein the processing circuit is configured to perform a dead-head baseline test on the pump to determine and store the predetermined speed, the predetermined dead-head pressure, and the predetermined pressure difference.

18. The fluid supply system of claim 17, wherein, to perform the dead-head baseline test, the processing circuit is configured to:

operate the pump at a predetermined output pressure and the predetermined output flow rate;

determine a first speed required to achieve the predetermined output pressure and the predetermined output flow rate, wherein the first speed is the predetermined speed;

dead-head the pump a first time such that the predetermined output flow rate decreases to at least the threshold level while maintaining the first speed;

determine a first dead-head pressure in response to dead-heading the pump the first time, wherein the first dead-head pressure is the predetermined dead-head pressure;

operate the pump at the predetermined output pressure and a maximum output flow rate;

determine a second speed required to achieve the predetermined output pressure and the maximum output flow rate;

dead-head the pump a second time such that the maximum output flow rate decreases to at least the threshold level while maintaining the second speed;

determine a second dead-head pressure in response to dead-heading the pump the second time; and determine a baseline pressure difference between the second dead-head pressure and the first dead-head pressure, wherein the baseline pressure difference is the predetermined pressure difference.

* * * * *